United States Patent
Hiljanen et al.

(10) Patent No.: US 12,510,241 B2
(45) Date of Patent: Dec. 30, 2025

(54) METHOD FOR HEATING A HEAT EXCHANGE MEDIUM IN A FLUIDIZED BED BOILER, A FLUIDIZED BED BOILER, AND A LOOPSEAL HEAT EXCHANGER

(71) Applicant: Valmet Technologies Oy, Espoo (FI)

(72) Inventors: Juha Hiljanen, Tampere (FI); Pekka Lehtonen, Tampere (FI); Pertti Tapiainen, Tampere (FI); Mikko Varonen, Tampere (FI)

(73) Assignee: Valmet Technologies Oy, Espoo (FI)

( * ) Notice: Subject to any disclaimer, the term of this patent is extended or adjusted under 35 U.S.C. 154(b) by 230 days.

(21) Appl. No.: 18/251,811

(22) PCT Filed: Nov. 2, 2021

(86) PCT No.: PCT/FI2021/050743
§ 371 (c)(1),
(2) Date: May 4, 2023

(87) PCT Pub. No.: WO2022/106749
PCT Pub. Date: May 27, 2022

(65) Prior Publication Data
US 2024/0003534 A1  Jan. 4, 2024

(30) Foreign Application Priority Data
Nov. 19, 2020 (FI) ..................................... 20206175

(51) Int. Cl.
*F22B 31/04* (2006.01)
*F01D 15/10* (2006.01)
(Continued)

(52) U.S. Cl.
CPC .............. *F22B 31/04* (2013.01); *F01D 15/10* (2013.01); *F23C 6/02* (2013.01); *F28D 13/00* (2013.01);
(Continued)

(58) Field of Classification Search
CPC .. F01D 15/10; F05D 2220/76; F22B 31/0084; F22B 31/0092; F22B 31/04;
(Continued)

(56) References Cited

U.S. PATENT DOCUMENTS 4,688,521 A * 8/1987 Korenberg ............ F23C 10/005
 110/263
4,947,804 A * 8/1990 Abdulally .................. B01J 8/26
 110/216
(Continued)

FOREIGN PATENT DOCUMENTS

CN 103363517 A 10/2013
EP 1365192 A1 11/2003
(Continued)

OTHER PUBLICATIONS

International Search Report and Written Opinion for International Application No. PCT/FI2021/050743, dated Jan. 31, 2022, (12 pages), European Patent Office, Rijswijk, Netherlands.
(Continued)

*Primary Examiner* — Jesse S Bogue
(74) *Attorney, Agent, or Firm* — ALSTON & BIRD LLP

(57) ABSTRACT

A method for heating a heat exchange medium in a fluidized bed boiler (100), the method comprising burning first fuel (165) in a first furnace (162) of the fluidized bed boiler (100) to produce first flue gas (163); recovering heat from the first flue gas (163) to a heat exchange medium using a first heat exchanger (310); conveying the heat exchange medium from the first heat exchanger (310) to a second heat exchanger (320), of which at least a part is arranged in contact with a fluidized bed of the fluidized bed boiler (100); burning second fuel (175) in a second furnace (172) of the fluidized bed boiler (100) to produce second flue gas (173); conveying the heat exchange medium from the second heat exchanger (320) to a third heat exchanger (330); and recovering heat
(Continued)

from the second flue gas (173) to the heat exchange medium using the third heat exchanger (330). A fluidized bed boiler (100) for performing the method. A loopseal heat exchanger (400) that is, when installed in a loopseal of a circulating fluidized bed boiler, configured to burn second fuel (175) in a second furnace (172) of the loopseal heat exchanger (400) to produce second flue gas (173); convey the heat exchange medium from the second heat exchanger (320) to a third heat exchanger (330); and recover heat from the second flue gas (173) to the heat exchange medium using the third heat exchanger (330).

14 Claims, 12 Drawing Sheets

(51) Int. Cl.
   *F23C 6/02* (2006.01)
   *F28D 13/00* (2006.01)
   *H02K 7/18* (2006.01)
   *F23C 10/10* (2006.01)
(52) U.S. Cl.
   CPC ....... *H02K 7/1823* (2013.01); *F05D 2220/76* (2013.01); *F23C 10/10* (2013.01)
(58) Field of Classification Search
   CPC . F23C 10/10; F23C 6/02; F28D 13/00; H02K 7/1823
   See application file for complete search history.

(56) References Cited

U.S. PATENT DOCUMENTS

| | | | |
|---|---|---|---|
| 9,175,850 B1* | 11/2015 | Touchton | F23C 10/10 |
| 9,371,987 B2* | 6/2016 | Petänen | F22B 31/0084 |
| 10,890,323 B2* | 1/2021 | Lehtonen | F28D 13/00 |
| 11,603,989 B2* | 3/2023 | Lehtonen | F23C 10/04 |
| 2020/0363056 A1* | 11/2020 | Varonen | F22B 31/04 |

FOREIGN PATENT DOCUMENTS

| | | |
|---|---|---|
| EP | 2107098 A2 | 10/2009 |
| EP | 3415816 A1 | 12/2018 |
| JP | H10-9545 A | 1/1998 |
| WO | WO-2019/083367 A1 | 5/2018 |
| WO | WO-2019/086752 A1 | 5/2019 |
| WO | WO-2019/122509 A1 | 6/2019 |

OTHER PUBLICATIONS

International Preliminary Report On Patentability Under Chapter II for International Application No. PCT/FI2021/050743, dated Sep. 26, 2022, (46 pages, European Patent Office, Munich, Germany.
Japanese Office Action for Application No. 2023-530157, dated Aug. 12, 2025, 10 pages.

* cited by examiner

III - III

IV - IV

V - V

VI - VI

VII - VII

IXb - IXb

Xb - Xb

METHOD FOR HEATING A HEAT EXCHANGE MEDIUM IN A FLUIDIZED BED BOILER, A FLUIDIZED BED BOILER, AND A LOOPSEAL HEAT EXCHANGER

CROSS REFERENCE TO RELATED APPLICATIONS

This application is a National Stage Application, filed under 35 U.S.C. § 371, of International Application No. PCT/FI2021/050743, filed Nov. 2, 2021, which international application claims priority to and the benefit of Finnish Application No. 20206175, filed Nov. 19, 2020; the contents of both of which as are hereby incorporated by reference in their entireties.

BACKGROUND

Related Field

The invention relates to fluidized bed boilers. The invention relates to fluidized bed boilers of the circulating bed type. The invention relates to loopseal heat exchangers for circulating fluidized bed boilers. The invention relates to production of steam by boiling water. The invention relates to production of sufficiently hot steam to be used in steam turbines for power generation. The invention relates to methods for reducing corrosion of heat transfer surfaces. The invention relates to burning low-quality fuel to produce steam. The invention relates to operating fluidized bed boilers at low loads.

DESCRIPTION OF RELATED ART

In order to efficiently produce mechanical energy from heat, e.g. for purposes of generating electricity, superheated steam is needed. Saturated steam can be produced by boiling water, and steam can be further heated (i.e. superheated) in a superheater (i.e. a first heat exchanger) recovering heat from flue gases. However, when low-quality fuel is burned, the flue gases contain a lot of alkali and/or halogen, which corrode the heat transfer surfaces at certain temperatures, for example when the gaseous alkali halides condense on the heat transfer surfaces, which are cooler than the flue gas. Thus, this poses an upper limit for the temperature of the superheated steam. For reasons of efficiency, hotter steam is required.

In fluidized bed boilers, this limit can be exceeded by applying downstream from the first heat exchanger another superheater (i.e. a second heat exchanger), which is arranged inside a fluidized bed of solid particulate bed material. Within the fluidized bed, the content of corrosive components of the flue gas is much less, and the heat transfer from the fluidized bed to the second heat exchanger is much better. Thus, there are less compounds to condense on heat transfer surfaces and also a higher surface temperature on the heat transfer surfaces, whereby the corrosion is reduced.

When designed in such a way, under normal operating conditions, high temperature steam can be produced by heating heat transfer medium subsequently in the first and second heat exchangers.

However, when the load of the fluidized boiler decreases, less fuel is being burnt. As a result, the temperature of the bed material and/or an amount of circulated bed material may become so low that the second heat exchanger cannot sufficiently superheat the steam for purposes of the steam turbine. In such a case, the steam turbine needs to be shut down to prevent turbine failure. Thus, no electricity can be produced, even if that would be a purpose of the power plant comprising the fluidized bed boiler. Operating the boiler with excess fuel at low load would also considerably decrease efficiency, if even possible.

BRIEF SUMMARY

It has been found that the steam coming from the second superheater, i.e. from a second heat exchanger, can be further heated in a third heat exchanger. The heat required for the third heat exchanger can be supplied by burning second fuel. Preferably, the second fuel is of high quality in order not to arrive at the corrosion problems detailed in the background for the first heat exchanger. The method and the fluidized bed boiler are each described in more specific terms in the accompanying claims. The fluidized bed boiler can be a part of a power plant. The second fuel can be burnt in a loopseal heat exchanger, as also described in the accompanying claims. The loopseal heat exchanger is suitable for use in a circulating fluidized bed boiler. The dependent claims disclose some preferable embodiments in specific terms. The description and figures disclose these and other embodiments.

In the figures, Sx, Sy, and Sz depict three mutually perpendicular directions, directed according to the right hand rule, i.e. the vector product (i.e. cross product) of Sx and Sy, in this order, equals Sz. In use, the direction Sz is upward vertical, i.e. reverse to the gravitational force.

DETAILED DESCRIPTION OF VARIOUS EMBODIMENTS

Figure 1A:
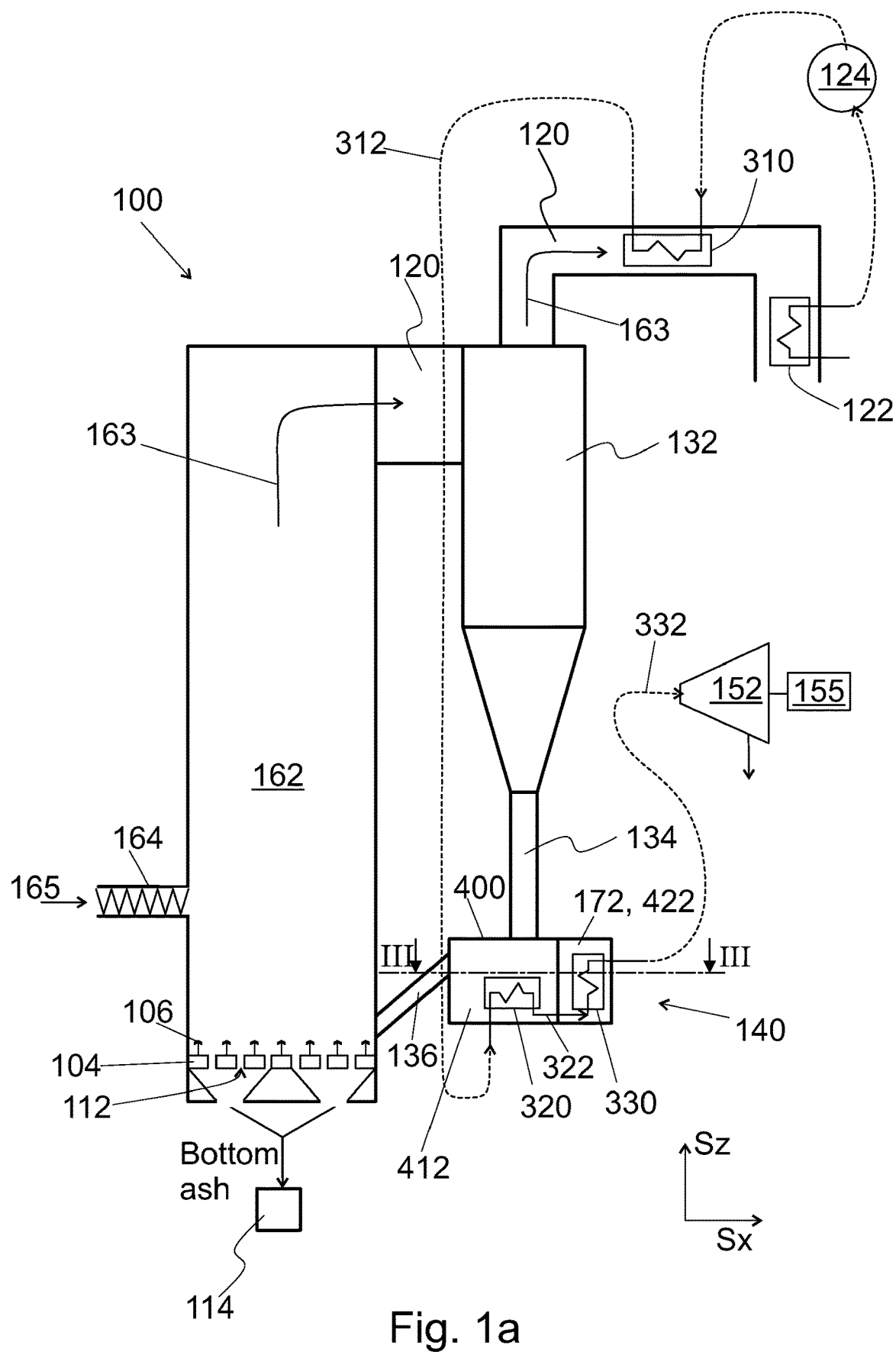
FIG. 1a shows a circulating fluidized bed boiler for executing a method for heating a heat exchange medium in a fluidized bed boiler.
Figure 1B:
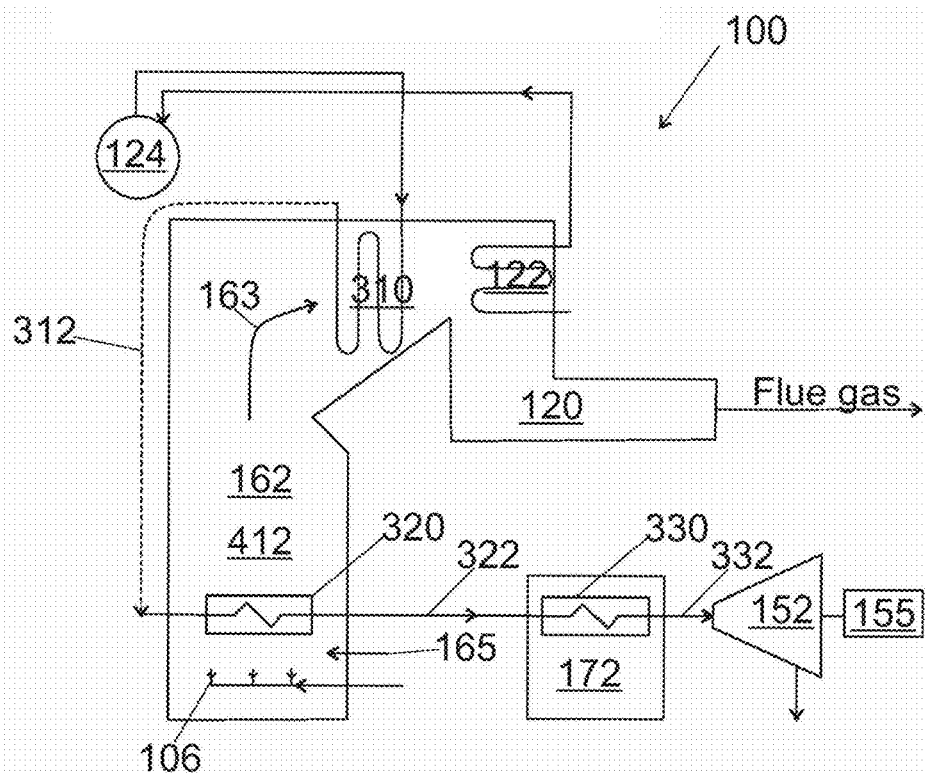
FIG. 1b shows a bubbling fluidized bed boiler for executing a method for heating a heat exchange medium in a fluidized bed boiler.

FIGS. 1a and 1b show embodiments of fluidized bed boilers 100. The fluidized bed boiler of FIG. 1a is a circulating fluidized bed boiler 100. The fluidized bed boiler of FIG. 1b is a bubbling fluidized bed boiler 100.

Referring to FIGS. 1a and 1b, the fluidized bed boiler 100 comprises a first furnace 162 for burning first fuel 165 to produce first flue gas 163. The first fuel may be of low-quality. Typically, the first fuel 165 comprises solid material, such as biomass and/or residue derived fuel. In order to recover heat from the first flue gas 163, the fluidized bed boiler 100 comprises a first heat exchanger 310 for recovering heat from the first flue gas 163 to a heat exchange medium. The first heat exchanger 310 may be a superheater, i.e. a heat exchanger configured to receive and heat steam. The heat exchange medium comprises at least one of water and steam. For example, saturated steam comprises $H_2O$ both in gaseous form and in liquid form, i.e. steam and water. However, superheated steam is free from liquid water. As detailed in background, a purpose of a fluidized bed boiler is to produce superheated steam from water.

For reasons indicated in background, the steam coming from the first heat exchanger 310 needs to be further heated. Thus, the fluidized bed boiler 100 comprises a second heat exchanger 320 and a first pipeline 312 for conveying the heat exchange medium from the first heat exchanger 310 to the second heat exchanger 320. Preferably, the first pipeline 312 does not comprise a heat exchanger configured to heat or cool the heat exchange medium in between the first and second heat exchanger 310, 320. In this way, preferably, in the direction of flow of steam within the steam circulation of the fluidized bed boiler 100, the first heat exchanger 310 is such a last heat exchanger that no other heat exchanger that is arranged to be in contact with the first flue gas 163 is arranged downstream from the first heat exchanger 310. Thus, in such a case, the first heat exchanger 310 is also such a last heat exchanger that no other heat exchanger in which in use the steam is at least as hot as in the first heat exchanger 310 is arranged to be in contact with only the first flue gas 163 (see FIGS. 1a and 1b). Naturally, downstream from the steam turbine 152 the steam may condense and be recirculated to an economizer 122, which is in contact with the first flue gas 163. Moreover, the second heat exchanger 320 is not arranged to be in contact with only the first flue gas, as it is in contact with bed material. In addition, a third heat exchanger 330 is preferably not in contact with the first flue gas 163 at all, as detailed below.

The second heat exchanger 320 is arranged in such a location that in use, a fluidized bed of bed material is configured to contact the second heat exchanger 320. The bed material comprises solid and heat resistant particulate material. Thus, the bed material that contacts the second heat exchanger 320 can be fluidized by blowing a sufficient amount of fluidizing gas therethrough. The bed material is heat resistant so that it does not burn in the first furnace 162. Benefits of having the second heat exchanger in contact with a fluidized bed have been discussed in the background.

For example, the second heat exchanger 320 may be arranged in a first chamber (412, 162) of the fluidized bed boiler 100 or in a wall of the first chamber (412, 162), wherein in the first chamber (412, 162), a fluidized bed is configured to be formed in use. The first furnace 162 can be considered to be a chamber in this sense.

Referring to FIG. 1a, in a circulating fluidized bed boiler, the first chamber 412 may be a chamber of a loopseal heat exchanger 400. Heat exchange surfaces, such as heat exchange pipes, of the second heat exchanger 320 may be arranged within the first chamber 412. In addition or alternatively, heat exchange surfaces, such as heat exchange pipes, of the second heat exchanger 320 may be arranged in walls of the first chamber 412.

Referring to FIG. 1b, in a bubbling fluidized bed boiler, the first furnace 162 may serve as the first chamber. Heat exchange surfaces, such as heat exchange pipes, of the second heat exchanger 320 may be arranged within such a lower part of the first furnace 162, that the bubbling fluidized bed is configured to be formed in the lower part of the first furnace 162.

Figures 2A, 2B, 2C:
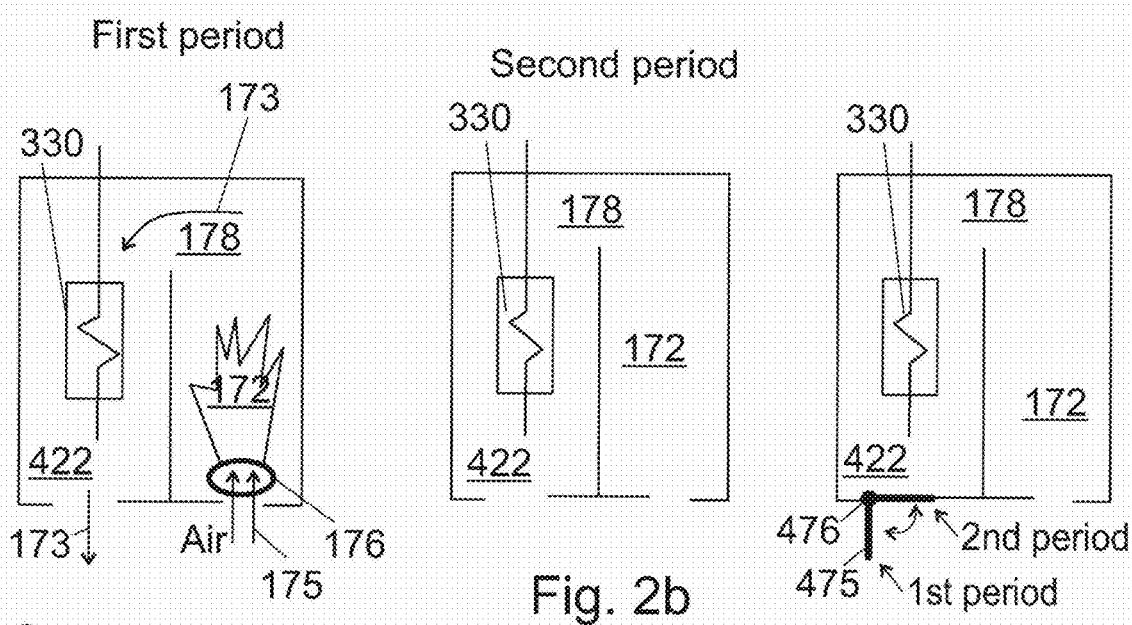
FIG. 2a shows operating a fluidized bed boiler at a low load.
FIG. 2b shows operating a fluidized bed boiler at a high load.
FIG. 2c shows operation a damper.

Referring to FIGS. 1a and 1b, in order to further heat the heat exchange medium, the fluidized bed boiler 100 comprises a second furnace 172 for burning second fuel 175 to produce second flue gas 173, and a third heat exchanger 330 for recovering heat from the second flue gas 173 to the heat exchange medium received from the second heat exchanger 320. FIG. 2a shows in more detail the second furnace 172, the second fuel 175, the second flue gas 173, the third heat exchanger 330 arranged in a second chamber 422, and a passage 178 for conveying the second flue gas 173 to the second chamber 422. As indicated in FIG. 2a, a burner 176 is arranged in the second furnace 172. The burner 176 is configured to burn the second fuel 175. This applies to at least one of the fluidized bed boiler 100 and a loopseal heat exchanger 400 for a circulating fluidized bed boiler. In this way the fluidized bed boiler 100 or a loopseal heat exchanger 400 comprises a burner 176 arranged in the second furnace 172. The burner 176 may be configured to burn gaseous or liquid second fuel 175. As is evident a burner 176 may be arranged to the second furnace 172 of the other Figures, too, even if not explicitly shown.

Referring to FIG. 1a, the second and third heat exchangers 320, 330 may be arranged close to each other. Thus, the heat exchange medium may flow directly from the second heat exchanger 320 to the third heat exchanger 330, e.g. through a short pipe, which may be considered to be a part of one of the heat exchangers 320, 330, or a part of a second pipeline 322.

Referring to FIG. 1b, the fluidized bed boiler 100 may comprise a second pipeline 322 for conveying the heat exchange medium from the second heat exchanger 320 to the third heat exchanger 330. Preferably, the second pipeline 322 does not comprise a heat exchanger configured to heat or cool the heat exchange medium in between the second and third heat exchangers 320, 330.

Referring to FIGS. 2a and 2b, the fluidized bed boiler 100 and/or a loopseal heat exchanger 400 for a circulating fluidized bed boiler may be operated in two modes. Referring to FIG. 2a, in a first mode (i.e. at a first period of time), the second furnace 172 is used to burn the second fuel 175 and in this way to further heat the heat exchange medium through second flue gas 173. In the first mode, the second heat exchanger 320 needs not heat the heat exchange medium. Referring to FIG. 2b, in a second mode (i.e. at a second period of time), the second furnace 172 is used not used (i.e. second fuel 175 is not burnt), or a much smaller amount of the second fuel 175 is burnt. Thus, effectively, the third heat exchanger 330 is not used.

More specifically, referring to FIGS. 1a and 1b, in the first mode and in the second mode, a method for heating a heat exchange medium in a fluidized bed boiler 100 comprises burning first fuel 165 in a first furnace 162 of the fluidized bed boiler 100 to produce first flue gas 163 and recovering heat from the first flue gas 163 to a heat exchange medium using a first heat exchanger 310. From the first heat exchanger 310, the heat exchange medium is conveyed to the second heat exchanger 320. As detailed above, at least a part of the second heat exchanger 320 is arranged in contact with a fluidized bed of the fluidized bed boiler 100. More preferably, all heat transfer surfaces of the second heat exchanger 320 are arranged in contact with a fluidized bed of the fluidized bed boiler 100. The fluidized bed may be arranged in a loopseal heat exchanger 400 (FIG. 1a) or in the first furnace 162 (FIG. 1b). The method further comprises conveying the heat exchange medium through the second heat exchanger 320 and from the second heat exchanger 320 to the third heat exchanger 330.

Referring to FIG. 2a, in the first mode, i.e. at the first period of time, the method comprises burning second fuel 175 in a second furnace 172 of the fluidized bed boiler 100 to produce second flue gas 173 and recovering heat from the second flue gas 173 to the heat exchange medium using the third heat exchanger 330. The first mode may correspond to an operating condition, wherein a load of the fluidized boiler 100 is low. Thus, in an embodiment, during the first period of time a load of the fluidized boiler 100 is less than a threshold. Moreover, because the fluidized bed, in which at least a part of the second heat exchanger 320 is arranged, needs not be hot at the first period of time, the heat exchange medium needs not be heated in the second heat exchanger 320. However, the heat exchange medium is heated in the third heat exchanger 330. Moreover, typically the fluidized bed is somewhat hotter than the heat exchange medium running through the second heat exchanger 320. Thus, preferably the method comprises also during the first period of time recovering heat from a fluidized bed of the fluidized bed boiler 100 to the heat exchange medium using the second heat exchanger 320, of which at least a part is arranged in contact with the fluidized bed of the fluidized bed boiler 100.

As for arranging at least a part of the second heat exchanger 320 in contact with a fluidized bed of the fluidized bed boiler 100, reference is made to FIGS. 1a and 1b. In case of a circulating fluidized bed boiler 100 (FIG. 1a), a circulating fluidized bed is arranged in the first furnace 162. Heating the heat exchange medium in a circulating fluidized bed boiler comprises circulating bed material from the first furnace 162 to a cyclone 132, from the cyclone 132 to a loopseal 140, and from the loopseal 140 to the first furnace 162, e.g. via a return channel 136. However, the loopseal 140 may be arranged in contact with a wall of the first furnace 162, whereby the return channel 136 may be short, e.g. an aperture in a wall. In use, another fluidized bed is arranged in the loopseal 140 of the circulating fluidized bed boiler 100 to facilitate circulation of the bed material through the loopseal. In the embodiment of FIG. 1a, the second heat exchanger 320 is arranged in the loopseal 140 of the of the fluidized bed boiler 100. This is also a preferable location for the second heat exchanger 320 for multiple reasons:

less erosion than in the first furnace, because of smaller particle velocity,
less corrosion than in the first furnace, because the cyclone 132 separates the corrosive first flue gas 163 to a flue gas channel 120, and
easier integration with the second furnace 172 and the third heat exchanger 330.

The bed material may be conveyed from a bottom part of the cyclone 132 to a loopseal heat exchanger 400 arranged in the loopseal 140 via a dipleg channel 134. The term dipleg refers to a channel, in which the bed material is configured to flow mainly downwards. From the loopseal heat exchanger 400, the bed material is configured to return to the first furnace 162 via the return channel 136.

The fluidized bed boiler 100 (either circulating of bubbling) and/or a loopseal heat exchanger 400 for a circulating fluidized bed boiler 100 may comprise a damper, i.e. a third damper 475 as shown in FIG. 2c. If a third damper 475 is used, in the first mode, i.e. during the first period, the third damper 475 is in an open position to enable circulation of second flue gas 173.

Referring to FIG. 2b, in the second mode, i.e. at the second period of time, the method comprises recovering heat from the fluidized bed that is arranged to contact at least a part of the second heat exchanger 320, by the second heat exchanger 320, to the heat exchange medium.

Preferably, the fluidized bed boiler 100 is designed in such a way that the circulation of the heat exchange medium needs not be controlled when switching from the first mode to the second mode. Therefore, in an embodiment, also in the second mode, the method comprises conveying the heat exchange medium from the second heat exchanger 320 to the third heat exchanger 330, and conveying the heat exchange medium through the third heat exchanger 330. Thus, the heat exchange medium may circulate in a similar manner in the second mode as in the first mode. While this may not be needed to heat the heat transfer medium, this reduces investment costs and improves robustness of the fluidized bed boiler 100.

However, in the second mode, the heat exchange medium is conveyed through the third heat exchanger 330 without burning the second fuel 175 in the second furnace 172 during the second period of time. This is may be done to diminish use of the second fuel 175. In the alternative, a lesser amount (in terms of mass per time, on the average) of the second fuel 175 may be burnt during the second period than during the first period. For example a consumption (in terms of mass per time on the average) of the second fuel 175 during the second period of time may be less than half, less than a quarter, or less than a tenth, of the a consumption (in terms of mass per time) of the second fuel 175 during the first period of time.

Because the heat exchange medium circulates through the third heat exchanger 330 also in the second mode, i.e. during the second period, the fluidized bed boiler 100 and/or a loopseal heat exchanger 400 for a fluidized bed boiler 100, may comprise the third damper 475. A purpose of the third damper is to prevent circulation of air through the third heat exchanger 330 in the second mode. Thus, at the second period, the third damper 475 may be in a closed position, as indicated in FIG. 2c. In this way heat loss to circulating air is minimized at the second period. However, depending on design details, natural convection of air through the third heat exchanger 330 may be so small that a third damper 475 is not needed. The third damper 475 may be e.g. slidable. The third damper 475 may be e.g. pivotable about an axis 476 (see FIG. 2c). Further or other dampers may be used for the purpose as detailed below. In FIG. 2c, the third damper 475 is arranged downstream from the third heat exchanger 330 (downstream in the direction of flow of the second flue gas 173 during the first period). Even if not shown, the third damper 475 may be arranged upstream from the burner 176. Even if not shown, the third damper 475 may be arranged downstream from the burner 176 and upstream from the third heat exchanger 330. It is noted that during the second period, the steam may slightly cool down while propagating through the third heat exchanger 330 even if a damper is used.

The second mode may correspond to an operating condition, wherein a load of the fluidized boiler 100 is high. Thus, in an embodiment, during the second period of time, a load of the fluidized boiler 100 more than during the first period of time. For example, during the second period of time, a load of the fluidized boiler 100 may be at least equal to the threshold. Reference is made to the threshold of load discussed in connection with the first mode. A precise value for the threshold depends on details of the case, but in a typical circulating fluidized bed boiler the threshold may be e.g. from 30% to 70% of the maximal load of the fluidized bed boiler, such as 50% of the maximal load of the fluidized bed boiler.

In a preferable embodiment, the third heat exchanger 330 is not in contact with the first flue gas 163. This has the effect that even if low-quality fuel is used as the first fuel 165, which produces the first flue gas 163, the corrosive compounds of the first flue gas 163 do not corrode the third heat exchanger 330.

In a preferable embodiment, the third heat exchanger 330 is not in contact with a fluidized bed of the fluidized bed boiler 100. In particular, in an embodiment, the third heat exchanger 330 is not in contact with the same fluidized bed that is in contact with the second heat exchanger 320. Preferably, the third heat exchanger 330 is not in contact with any fluidized bed that is constituted by fluidizing solid, heat resistant, and particulate material. This has the effect that heat of the second fuel 175 can be directly utilized at the third heat exchanger 330. Thus, heat of the second flue gas 173 is not consumed to heat bed material of a fluidized bed. Moreover, control of the process becomes more rapid, since bed material needs not be heated when changing from the second mode to the first mode; and bed material needs not be cooled when changing from the first mode to the second mode. Furthermore when the third heat exchanger 330 is not in contact with a fluidized bed of the fluidized bed boiler 100, problems related to agglomeration and/or sintering of bed material are avoided at least near the third heat exchanger 330. Moreover, when the third heat exchanger 330 is not in contact with a fluidized bed of the fluidized bed boiler 100, problems related to erosion of the heat exchanger surfaces by the bed material are avoided at the surfaces of the third heat exchanger 330.

The method and fluidized bed boiler allows for using the fluidized bed boiler 100 in low loads (by operating in the first mode), and also when low-quality fuel is used as the first fuel 165. Herein the term quality of fuel refers at least to a total content of alkalis and halogens of the fuel (applies to first 165 and second 175 fuel). The term alkali refers to elements of group 1 of the IUPAC periodic table of elements excluding hydrogen, and the term halogen refers to elements of group 17 of the IUPAC periodic table of elements. The alkalis and halogens are typically comprised by compounds of the fuel. When burnt, at least some of the alkalis and the halogens end ups in the flue gas (applies to first 163 and second 173 flue gases; however, the second fuel may be substantially free from alkalis and halogens). In the flue gas, these elements typically form alkali halides, i.e. a compound comprising an alkali element and a halogen element, examples including NaCl, NaF, NaBr, KCl, KF, and KBr. Some of the alkalis and the halogens may remain in the ash. The corrosion problems related to low-quality fuels are avoided by using, as the second flue 175, a high quality fuel.

Therefore, in an embodiment, the second flue gas 173 comprises less alkali and halogen than the first flue gas 163. The alkali and/or the halogen may be comprised by alkali halides of the flue gas (163, 173). These compounds result from the quality of the fuel. Therefore, in the same or in another embodiment, the second fuel 175 comprises less alkali and halogen than the first fuel 165. More specifically, a content of the compounds comprising at least one of alkali and halogen in the second fuel 175 is less than a content of the compounds comprising at least one of alkali and halogen in the first fuel 173.

In a preferable embodiment, the second fuel 175 comprises less than 500 ppm or less than 100 ppm on weight basis alkali atoms and halogen atoms. Naturally the atoms are not free, but parts of chemical composition(s) of the second fuel 175. Moreover, in an embodiment, the second flue gas 173 comprises less than 500 ppm, preferably less than 100 ppm, on weight basis alkali halides.

Typically, the high-quality fuels are gases or liquids, such as natural gas or a light oil. Therefore, in an embodiment, the second fuel 175 is a liquid or gas at a temperature of 20° C. and a pressure of 1 atm, such as a gas comprising natural gas or a liquid comprising oil, e.g. light fuel oil. More preferable, to ensure smooth feed of the second fuel 175, the second fuel is free from solid particles at the aforementioned temperature and pressure.

However, as indicated above, the first fuel 165 needs not be of high quality. Moreover, in order to save operational costs, preferably, the first fuel 164 is of low quality. Therefore, in an embodiment, the first fuel 165 comprises solid material, such as biomass and/or residue derived fuel, at a temperature of 20° C. and a pressure of 1 atm. Even more preferably, at the aforementioned temperature and pressure, [A] the second fuel 175 is gas or liquid and [B] the first fuel 165 comprises solid material.

As detailed above, preferably, the second furnace 172 is arranged in a loopseal 142 of a circulating fluidized bed boiler. More preferably, the second furnace 172 and the third heat exchanger 330 are arranged as part of a loopseal heat exchanger 400. FIGS. 3 to 7 show details of a loopseal heat exchanger 400. The loopseal heat exchanger 400 is, when installed in a loopseal of a circulating fluidized bed boiler 100, configured to:

burn the second fuel 175 in the second furnace 172 of the loopseal heat exchanger 400 to produce second the flue gas 173;

convey the heat exchange medium from the second heat exchanger 320 to the third heat exchanger 330 of the loopseal heat exchanger 400; and recover heat from the second flue gas 173 to the heat exchange medium using the third heat exchanger 330.

Other components of a fluidized bed boiler 100, shown in FIG. 1a for the purpose of understanding the context of the embodiments, include a feeder 164 configured to feed the first fuel 165 into the first furnace 162; and air channels 104 for feeding combustion air 106 to the first furnace 162. The combustion air 106 functions as an oxygen source for combustion and as (at least a part of) fluidizing gas. As detailed below, the term "combustion air" may refer to a mixture of air and some other gas, in particular a mixture of air and the second flue gas 173. As detailed below, also other gas, in particular second flue gas, may be used to further fluidize the material within the first furnace 162.

In between the air channels 104, ash channels 112 are provided for removing bottom ash from the first furnace 162. A bottom ash cooler 114 is configured to receive hot bottom ash and to recover heat therefrom. The first heat exchanger 310 is arranged in a flue gas duct 120. The fluidized bed boiler may comprise further heat exchangers, such as an economizer 122 configured to recover heat from the first flue gas 163. In general, an economizer is a heat exchanger receiving liquid heat exchange medium, in particular water. Typically the water does not boil in an economizer, even if heated. In a direction of flow of the heat exchange medium, the economizer 122 is arranged upstream from the first heat exchanger 310. A drum 124 may be provided in between the first heat exchanger 310 and the economizer 122 to separate a liquid part of the heat exchange medium (e.g. water) from a gaseous part of the heat exchange medium (e.g. steam). Moreover other heat exchangers (not shown) may be connected to the drum 124 to boil the water and generate saturated steam.

The heated heat exchange medium is preferably used to generate mechanical energy in a steam turbine 152. Thus, in an embodiment of the method, the heat exchange medium comprises steam, and the method comprises conveying steam from the third heat exchanger 330 to a steam turbine 152. Preferably, the steam is conveyed from the third heat exchanger 330 to the steam turbine 152 such that no heat exchanger is provided in between the third heat exchanger 330 and the steam turbine 152. Thus, preferably, the third heat exchanger 330 is the last heat exchanger before the steam turbine 152. In a corresponding manner, a power plant comprises the fluidized bed boiler 100 and the steam turbine 152, as indicated in FIGS. 1a and 1b. The power plant further comprises a third pipeline 332 configured to convey heat exchange medium from the third heat exchanger 330 to the steam turbine 152. Preferably, the third pipeline 332 does not comprise a heat exchanger configured to heat or cool the heat exchange medium in between the third heat exchanger 330 and the steam turbine 152.

Preferably, the method further comprises operating an electricity generator 155 using the steam turbine 152 and in this way producing electricity. A corresponding power plant comprises an electricity generator 155 arranged in a mechanical connection with the steam turbine 152. E.g. a shaft may be configured to be rotated by the steam turbine 152 and to operate the electricity generator, i.e. to rotate parts of the electricity generator 155.

Figure 3:
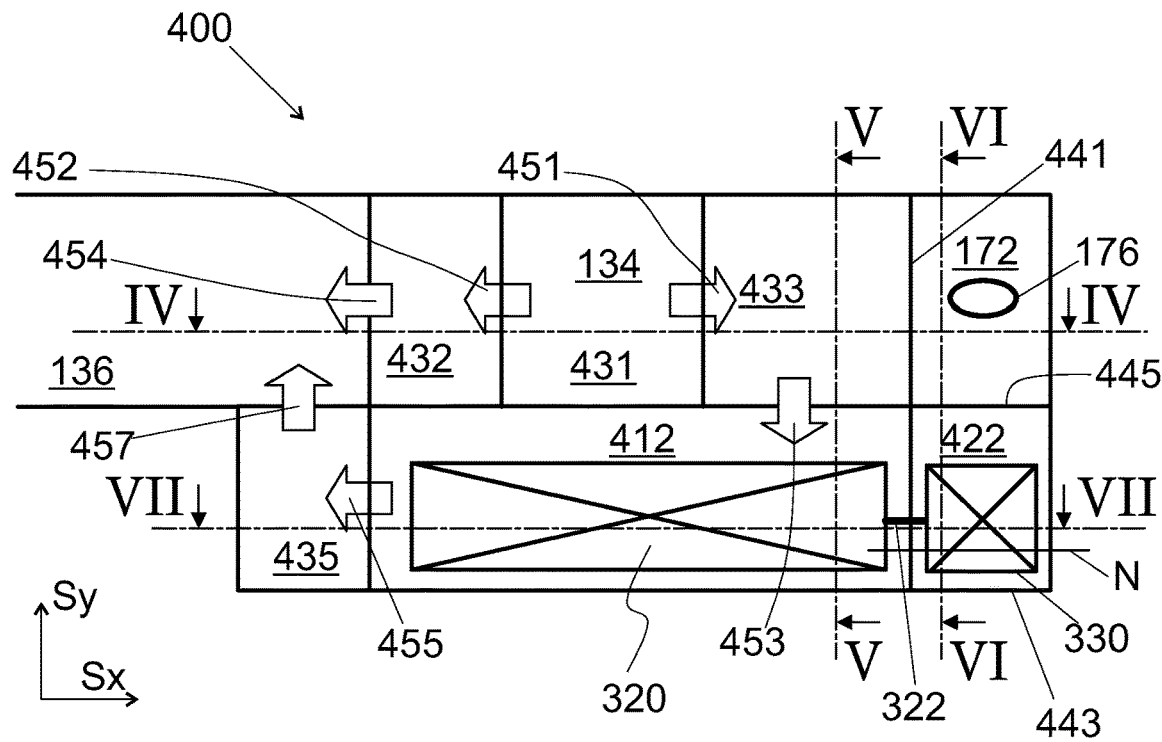
FIG. 3 shows a cross-sectional view III-III depicted in FIG. 1a of a loopseal heat exchanger.

FIG. 3 shows a cross section of an embodiment of a loopseal heat exchanger, 400 as seen from top (see FIG. 1a for the cut line III-III). In use, the loopseal heat exchanger 400 is arranged in the loopseal 140 of a circulating fluidized bed boiler 100. Thus, the loopseal heat exchanger 400 is suitable for such a purpose, even if not part of a boiler. The first chamber 412 of the fluidized bed boiler 100 is, in this embodiment, a first chamber 412 of the loopseal heat exchanger 400. Moreover, in this embodiment, the third heat exchanger 330 is arranged in a second chamber 422 of the loopseal heat exchanger 400.

Walls of the loopseal heat exchanger 400 limit (i.e. the loopseal heat exchanger 400 comprises) the first chamber 412, the second chamber 422, and the second furnace 172, of which functions have been detailed above. The second heat exchanger 320 is arranged in the first chamber 412, the third heat exchanger 330 is arranged in the second chamber 422, and the second pipeline 322 connects the second 320 and third 330 heat exchangers. The second pipeline 322 may run only within the chambers 412, 422 as in FIG. 3, or the a part of the second pipeline may run outside the chambers 412, 422, as in FIG. 9b.

The loopseal heat exchanger comprises an entrance chamber 431, to which the circulating bed material enters from the dipleg channel 134 (see FIG. 1a). From the entrance chamber 431 the bed material flows to at least one of an inlet chamber 433 and a bypass chamber 432 (see FIG. 3).

The bypass chamber 432 has two functions. First, the heat recovery by the second heat exchanger 320 can be controlled by controlling the amount of bed material that flows through the bypass chamber 432. The bypass chamber 432 does not have heat exchanger surfaces for heating the heat exchange medium. Thus, by guiding the flow of bed material only or mainly through the bypass chamber instead of the first chamber 412, the heat exchange medium becomes heated to a lesser extent in the second heat exchanger 320. Second, the bypass chamber 432 serves as a gas lock. The bypass chamber 432 is an upleg, i.e. the bed material flows mainly upwards in the bypass chamber 432. This, in connection with the dipleg channel 134 provides for a gas lock that prevents the bed material from flowing in a wrong direction, i.e. from the first furnace 162 to the loopseal heat exchanger 400.

The inlet chamber 433 is also designed as an upleg. Thus, the inlet chamber 433 serves mainly as a gas lock in combination with the dipleg channel 134. Moreover, another function of the inlet chamber 433 is to feed the bed material to the first chamber 412. From the first chamber 412, which is formed as a dipleg, the bed material flows to an outlet chamber 435, which is designed as an upleg.

In the embodiment of FIG. 3, the second heat exchanger 320 is arranged inside the first chamber 412 of a loopseal heat exchanger 400 and the third heat exchanger 330 is arranged inside a second chamber 422 of the loopseal heat exchanger 400. Having the heat exchanges arranged within the chambers is preferable, since this increases an area of the heat transfer surfaces and helps maintenance. However, the second heat exchanger 320 can be arranged within the walls of the first chamber 412. In a similar manner, the third heat exchanger 330 can be arranged within the walls of the second chamber 422.

Figure 14:
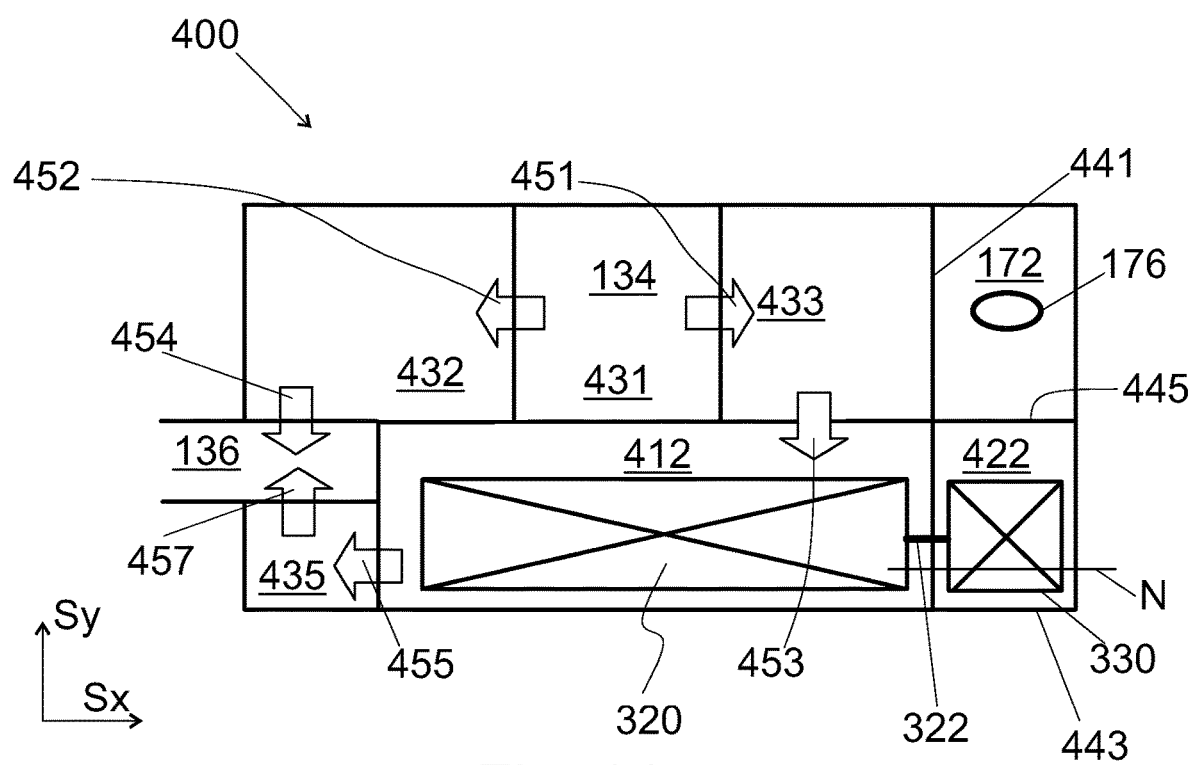
FIG. 14 shows a cross-sectional view of a loopseal heat exchanger.

From the outlet chamber 435 and/or from the bypass chamber 432, the bed material flows to the return channel 136. The direction of flow of bed material is shown by the arrows 451, 452, 453, 454, 455, and 457 in FIG. 3. Geometric details of the loopseal heat exchanger 400 may vary. For example, as indicated in FIG. 14, a part of the return channel 136 may be arranged between parallel walls of the bypass chamber 432 and the outlet chamber 435, and the bed material is configured to flow through apertures of these parallel walls to the return channel 136. Other types of loopseal heat exchangers will be detailed below.

In this way, the invention also relates to a new type of a fluidized bed heat exchanger 400. As detailed above, and shown in FIGS. 3 to 10b and 14, an embodiment of a fluidized bed heat exchanger 400 comprises the first chamber 412 and the second chamber 422. The second heat exchanger 320 is arranged inside (i.e. in) the first chamber 412 or in (i.e. as a part of) a wall that limits the first chamber 412. The third heat exchanger 330 arranged inside (i.e. in) the second chamber 422 or in (i.e. as part of) a wall that limits the second chamber 422. The loopseal heat exchanger 400 may comprise the second pipeline 322 for conveying the heat exchange medium from the second heat exchanger 320 to the third heat exchanger 330; and comprises first nozzles 462 (see FIG. 7) configured to fluidize the bed material in the first chamber 412. In order to further heat the heat exchange medium already within the loopseal heat exchanger 400, the loopseal heat exchanger 400 comprises the second furnace 172 for burning the second fuel 175 to produce the second flue gas 173; and a passage 178 for conveying the second flue gas 173 to the second chamber 422.

Figure 11:
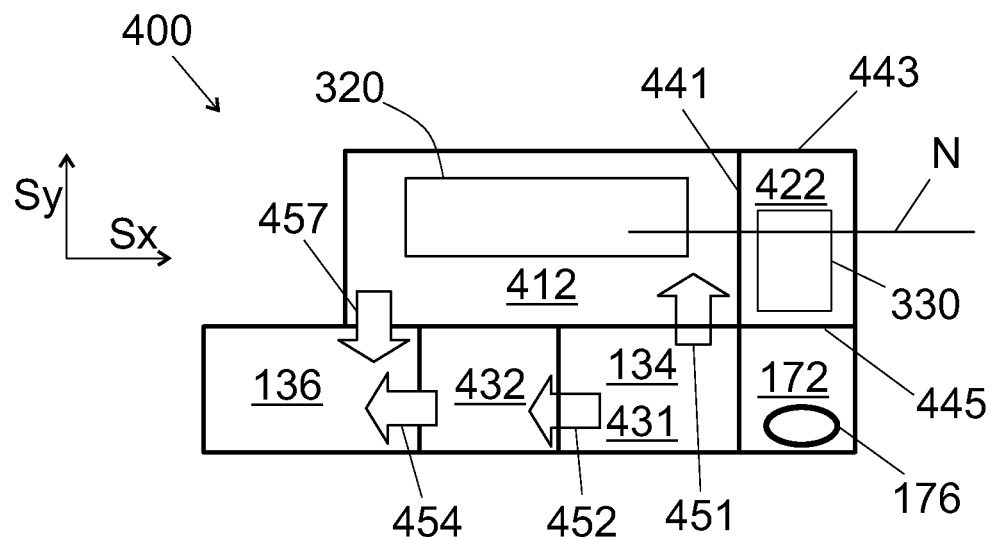
FIG. 11 shows a horizontal cross-sectional view of a loopseal heat exchanger having fewer chambers than the loopseal heat exchanger of FIG. 3.

In FIGS. 3, 11, and 14, the second chamber 422 is arranged next to the first chamber 412. Moreover, in FIGS. 3, 11, and 14, the second furnace 172 is arranged either next to the inlet chamber 433 (FIGS. 3 and 14) or next to the entrance chamber 431 (FIG. 11). Both these features, in isolation and in combination, are beneficial from the point of view of recovering energy. Because of this arrangement, the second furnace 172 is heated through a first wall 441. Thus, the second furnace 172 is not only heated by burning the second fuel, but also with the hot bed material arranged in the neighbouring chamber. In a similar manner, the second chamber 422 is heated through the first wall 441. Thus, the second chamber is not only heated by burning the second fuel, but also with the hot bed material. In this way, in an embodiment, a first side of a wall of the loopseal heat exchanger 400 (i.e. a first side of the first wall 441) limits the first chamber 412, and an opposite second side of the wall (i.e. the first wall 441) of the loopseal heat exchanger limits the second chamber 422. In addition, preferably, the first wall 441 comprises heat transfer tubes for recovering heat to the heat exchange medium. This applies both to the circulating fluidized bed boiler 100 and the loopseal heat exchanger 400. Moreover, when the second 320 and third 330 heat exchangers are arranged on opposite sides of the first wall 441 and in such a way that a normal N (see FIG. 3) of the first wall 441 runs through both the second heat exchanger 320 and the third heat exchanger 330, the second 320 and third 330 heat exchanger can be easily integrated. In other words, the connecting second pipeline 322 can be made short. This simplifies the structure of the loopseal heat exchanger and reduces manufacturing costs.

Moreover, the second chamber 422 and the first chamber 412 share a common wall. Referring to FIG. 3, the second chamber 422 and the first chamber 412 commonly share a second wall 443 of the loopseal heat exchanger 400. Referring to FIG. 3, the second chamber 422 and the first chamber 412 commonly share a third wall 445 of the loopseal heat exchanger 400. In addition, preferably, the second wall 443 comprises heat transfer tubes for recovering heat to the heat exchange medium. In addition, preferably, the third wall 445 comprises heat transfer tubes for recovering heat to the heat exchange medium.

As for the term "wall" herein the term refers to a planar object delimiting the chambers. Thus, the first wall 441 delimits the chambers 433, 172, 422, and 412 (see FIG. 3). As indicated in FIG. 3, the second wall 443 delimits the chambers 422, 412, and 435; and the third wall 445 delimits all the chambers of the loopseal heat exchanger of FIG. 3.

Therefore, in an embodiment a first side of a wall (i.e. the second wall 443) of the loopseal heat exchanger limits the first chamber 412, and the first side of the wall (i.e. the second wall 443) of the loopseal heat exchanger limits the second chamber 422. This is also beneficial from the point of view of keeping the outer shape of the loopseal heat exchanger 400 simple for installation.

While the position of third wall 445 is not critical, for manufacturing reasons it also preferably limits both the first and second chambers 412, 422. Thus, in FIG. 3, a first side of a wall (i.e. the third wall 445) of the loopseal heat exchanger limits the first chamber 412, and the first side of the wall (i.e. the third wall 445) of the loopseal heat exchanger limits the second chamber 422.

As shown in the figures, the second and third walls (443, 445) are arranged a distance apart from each other; i.e. they are not different parts of the same wall.

In the structure as discussed above, the second pipeline 322 can be made short or dispensed with. For example, referring to FIG. 15, the second heat exchanger 320 may comprise an inlet header 320a and an outlet header 320b, whereby the steam coming from the first superheater 310 may be distributed to the tubes of the second superheater 320 through the inlet header 320a, and the steam that has run through the tubes of the second superheater 320 may be collected in the outlet header 320b of the second heat exchanger 320. In a similar manner, the third heat exchanger 330 may comprise an inlet header 330a for distributing the steam to the tubes of the third heat exchanger 330; and an outlet header 330b for collecting the steam that has run through the tubes of the third heat exchanger 330.

Figure 15:
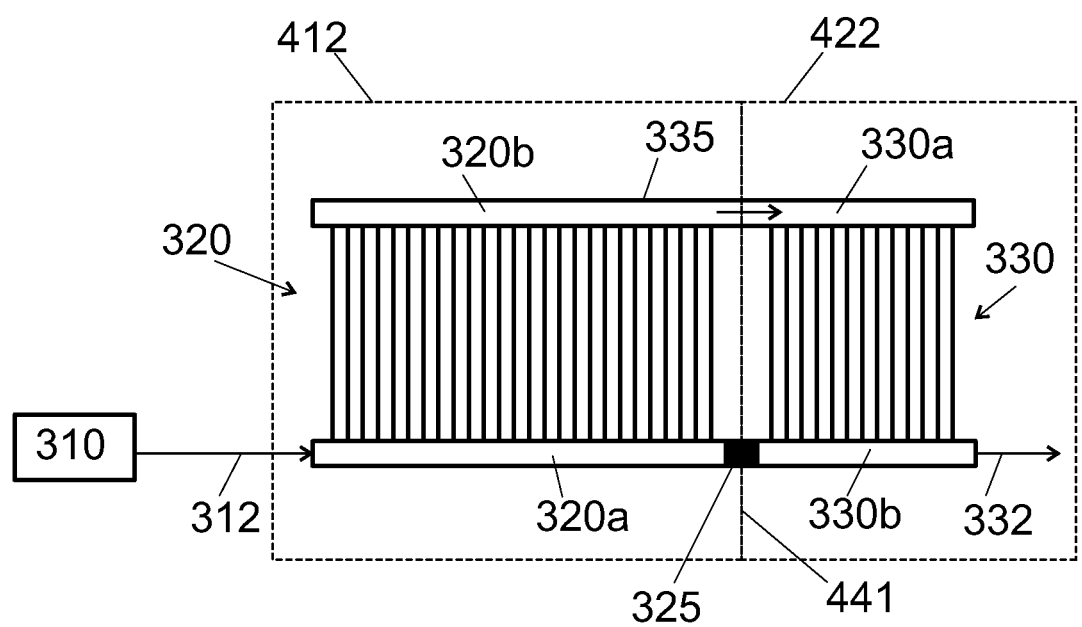
FIG. 15 shows integrating headers of second and third heat exchangers.

Referring to FIG. 15, the outlet header 320b of the second heat exchanger 320 and the inlet header 330a of the third heat exchanger may be arranged to form parts of a steam chamber 335. A part of the steam chamber 335 may be seen as forming the second pipeline 322. Having a steam chamber 335 that serves both as the outlet header 320b of the second heat exchanger 320 as well as the inlet header 330a of the third heat exchanger 330 further simplifies the structure of the loopseal heat exchanger 400 thereby reducing manufacturing costs. In addition, such a structure is mechanically sturdy. Such structure is easily achievable, when the second and third heat exchangers 320, 330 are arranged in neighbouring chambers 412, 422, as shown in the Figures. This relates also to the issue that a normal N of a first wall 441 of a loopseal superheater runs through both the second 320 and third 330 heat exchangers; an issue further detailed below.

Referring to FIG. 15, the inlet header 320a of the second heat exchanger 320 may be mechanically connected to the outlet header 330b of third heat exchanger 330. However, in such a case, a plug 325 may be used for preventing the steam from flowing directly from the inlet header 320a of the second heat exchanger 320 to the outlet header 330b of the third heat exchanger 330, e.g. if the connection between the headers 320a and 330b is a pipeline. The inlet header 320a of the second heat exchanger 320 and the outlet header 330b of the third heat exchanger 330 may be parts of the same tubular structure provided with the plug 325.

Figure 4:
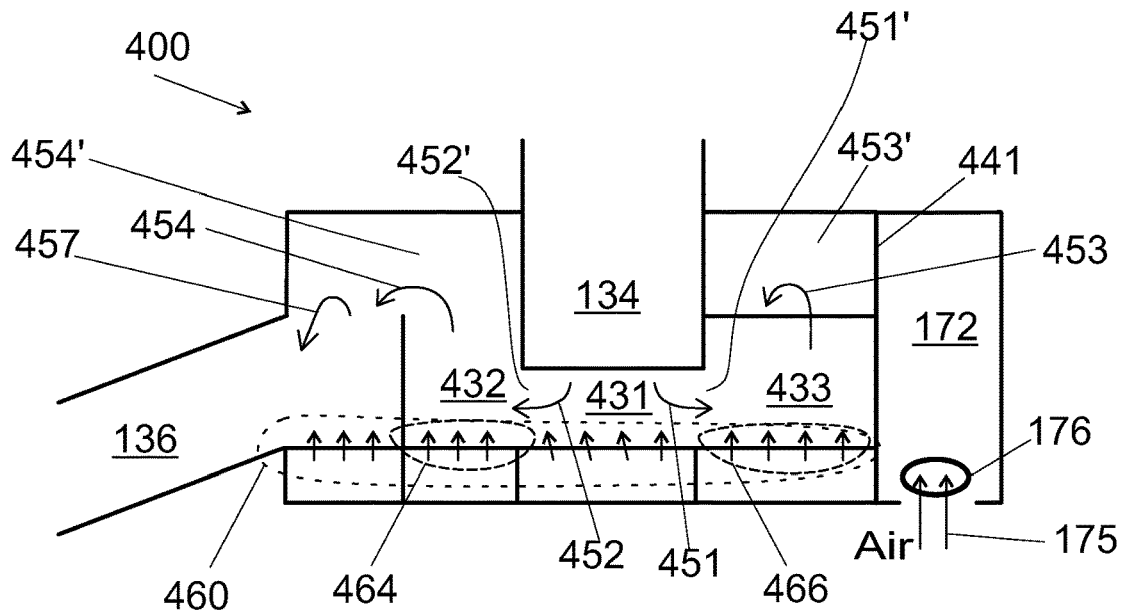
FIG. 4 shows a cross-sectional view IV-IV depicted in FIG. 3 of a loopseal heat exchanger.
Figure 5:
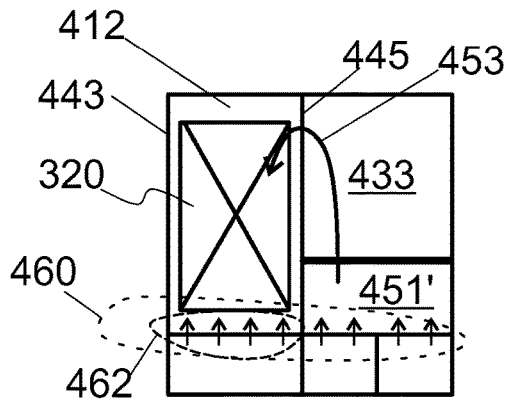
FIG. 5 shows a cross-sectional view V-V depicted in FIG. 3 of a loopseal heat exchanger.
Figure 6:
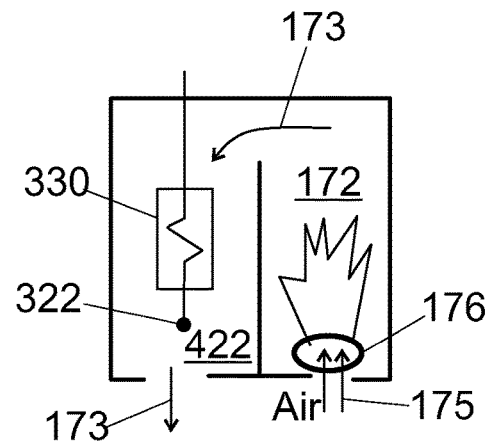
FIG. 6 shows a cross-sectional view VI-VI depicted in FIG. 3 of a loopseal heat exchanger.
Figure 7:
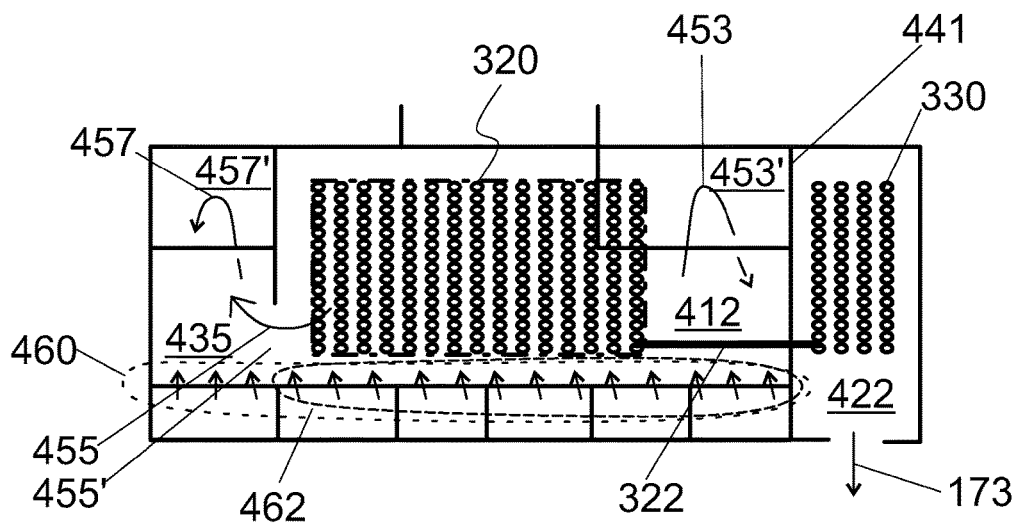
FIG. 7 shows a cross-sectional view VII-VII depicted in FIG. 3 of a loopseal heat exchanger.

As for the circulation of bed material within the loopseal heat exchanger 400 and through the first chamber 412, a first opening 451' is provided in a lower part of the entrance chamber 431 for allowing bed material to flow to the inlet chamber 433, as shown by the arrow 451 (see FIGS. 3 and 4). A second opening 453' is provided in an upper part of the inlet chamber 433 for allowing bed material to flow to the first chamber 412, as indicated by the arrow 453 (see FIGS. 4 and 7). A third opening 455' is provided in a lower part of the first chamber 412 for allowing bed material to flow to the outlet chamber 435 as indicated by the arrow 455 (see FIG. 7). Finally, a fourth opening 457' is provided in an upper part of the outlet chamber 435 for allowing the bed material to exit the loopseal heat exchanger 400, as depicted by the arrow 457.

As for the circulation of bed material within the loopseal heat exchanger 400 and through the bypass chamber 432, a fifth opening 452' is provided in a lower part of the entrance chamber 431 for allowing flow of bed material to the bypass chamber 432, as indicated by the arrow 452 (see FIGS. 3 and 4). A sixth opening 454' is provided in an upper part of the bypass chamber 432 for allowing the bed material to exit the loopseal heat exchanger 400, as depicted by the arrow 454.

The bed material is fluidized within the chambers of the loopseal heat exchanger 400, excluding the chambers without bed material, i.e. at least the first furnace 172 and the second chamber 422. However, the bed material need not be fluidized in all the chambers simultaneously. E.g. fluidizing of the material in the bypass chamber 432 may be stopped for controlling the flow through other chambers. For the purpose of fluidizing, the loopseal heat exchanger 400 comprises nozzles 460 (see FIGS. 4 and 5) arranged at a bottom of the chambers wherein the material is fluidized 400. As for more detailed function of the nozzles 460, the loopseal heat exchanger 400 comprises first nozzles 462 (see FIGS. 5 and 7) configured to fluidize the bed material in the first chamber 412. In this way, a fluidized bed is formed in the first chamber 412 so that the second heat exchanger 320 makes a contact with a fluidized bed of the fluidized bed boiler.

The loopseal heat exchanger 400 comprises second nozzles 464 (see FIG. 4) configured to fluidize the bed material in the bypass chamber 432. The loopseal heat exchanger 400 comprises third nozzles 466 (see FIG. 4) configured to fluidize the bed material in the inlet chamber 433. By controlling the amount of fluidizing air in the bypass chamber 432 and in the inlet chamber 433 one can control how much bed material is directed to bypass chamber 432 and how much to the inlet chamber 433. Typically, the more fluidizing gas is fed, the easier the bed material flows, and in this way the bed material flow increases; and vice versa.

Since the purpose of the third heat exchanger 330 is to superheat the steam to the final temperature during the first period (see FIG. 2a), the temperature of the heat exchange medium within the third heat exchanger 330 is at its highest during the first period. Thus, the second flue gas 173 has also downstream from the third heat exchanger 330 such a high temperature, that it can be used in at least the following ways to heat the heat exchange medium upstream from the third heat exchanger 330; e.g. by using the second heat exchanger 320 and/or the first heat exchanger 310 and/or
as fluidizing gas or as a part of a fluidizing gas of the fluidized bed boiler 100.

Concerning the former, the second flue gas 173 may be mixed with the first flue gas 163 e.g. upstream from the first heat exchanger 310. However, in terms of heat recovery, it may be beneficial to feed the second flue gas 173 much upstream from the first heat exchanger, whereby it may e.g. become used as fluidizing gas.

Concerning the latter, since the temperature of the second flue gas 173 is very high, using it as a fluidizing gas or as a part of a fluidizing gas implies that the remaining thermal energy of the second flue gas 173 is transferred to the bed material of the fluidized bed, and can thus be utilized in the process and recovered by conventional means. Examples of a fluidized bed, wherein the second flue gas 173 can be utilized as fluidizing gas, include the first furnace 162 (see FIGS. 1a and 1b) and the first chamber 412 (see FIG. 1a).

The fluidizing gas can comprise also other gas than the second flue gas 173. Not all the second flue gas needs to be used as at least a part of a fluidizing gas. Thus, a preferable embodiment comprises fluidizing a fluidized bed within the fluidized bed boiler 100 using fluidizing gas that comprises at least some of the second flue gas 173. For reasons of process simplicity, preferably all the second flue gas 173 is used in a same way. Thus, a more preferable embodiment comprises using at least 75% (by volume) of the second flue gas 173 to fluidize one or more fluidized beds of the fluidized bed boiler 100. Herein the fluidized bed may be the fluidized bed of the first furnace 162 or of the first chamber 412; and the second flue gas 173 may be used as at least a part of the fluidizing gases in both the fluidized beds.

Correspondingly, the fluidized bed boiler 100 preferably comprises a channel 179 for conveying at least some of the second flue gas 173 to such a chamber of the fluidized bed boiler, wherein a fluidized bed is configured to form in use. As an example, the fluidized bed boiler 100 may comprise a second flue gas channel 179 for conveying at least some of the second flue gas 173 to such a part of the first furnace 162, wherein a fluidized bed is configured to form. Referring to FIG. 1a, in use, in a circulating fluidized bed boiler, the material within substantially the whole first furnace 162 is fluidized. Referring to FIG. 1b, in use, in a bubbling fluidized bed boiler, the material within a lower part of the first furnace 162 is fluidized.

Figure 8A:
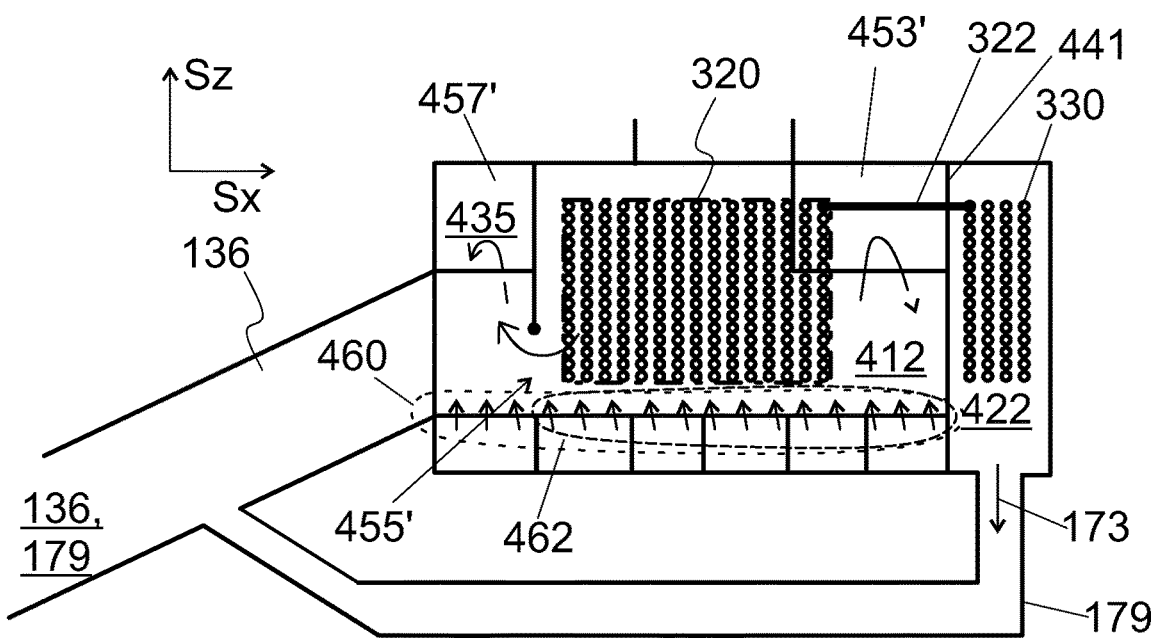
FIG. 8a shows a way for circulating second flue gas to be used as fluidizing gas.
Figure 8B:
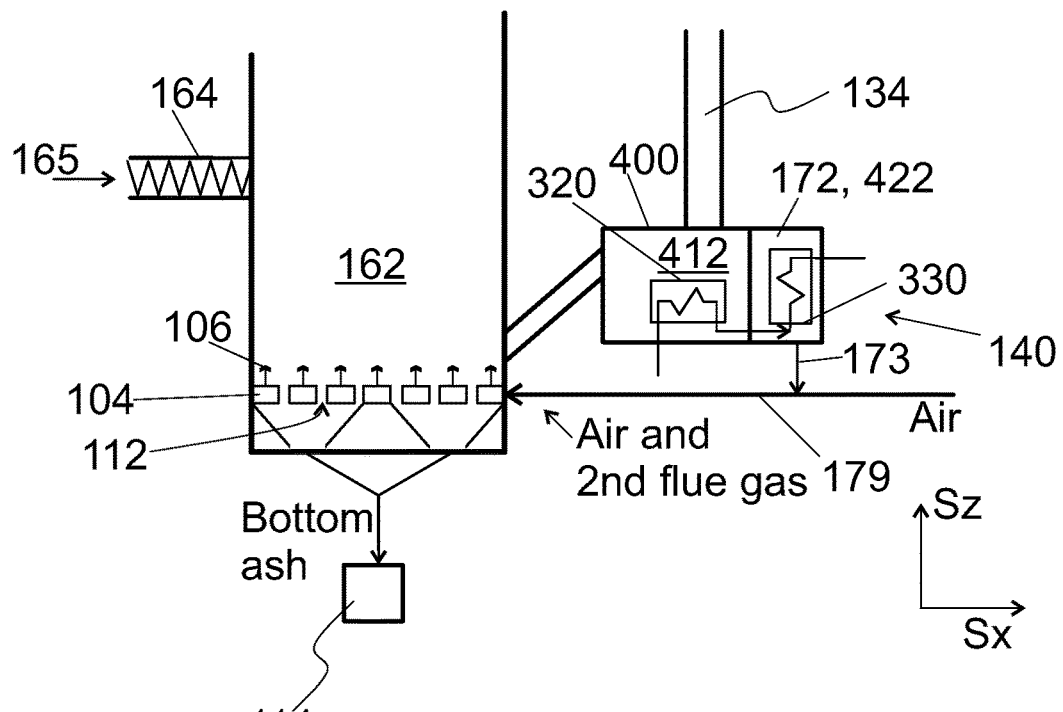
FIG. 8b shows a way for circulating second flue gas to be used as fluidizing gas.

For example, in the context of the embodiments of FIGS. 1a and 3 to 7, as depicted in FIG. 8a, the second flue gas 173 can be conveyed to the return channel 136 through the second flue gas channel 179. At some point within the second flue gas channel 179, the second flue gas 173 is mixed with the bed material of the return channel 136. Thereafter, through a combined second flue gas channel 179 and a return channel 136 both the bed material and the second flue gas 173 are conveyed into the first furnace 162. Therein the second flue gas 173 becomes mixed with the other fluidizing gas (i.e. combustion air), and is thus used as part of the fluidizing gas of the first furnace. Thus, the second flue gas 173 needs not be fed through the combustion air channel 104 of the fluidized bed boiler. However, as indicated in FIG. 8b, the second flue gas 173 can be mixed with the combustion air to be fed to the first furnace through the combustion air channel 104. In case the combustion air is preheated, as it typically is, the second flue gas is preferably mixed with the preheated combustion air (i.e. downstream from the combustion air preheaters) to improve efficiency of the preheating. In this way, a part of the combustion air piping forms a part of the second flue gas channel 179.

As discussed above, the third heat exchanger 330 can be arranged side-by-side (in a horizontal direction Sx) with respect to second heat exchanger 320. In other words, the first wall 441 may be a vertical wall.

Figure 9A:
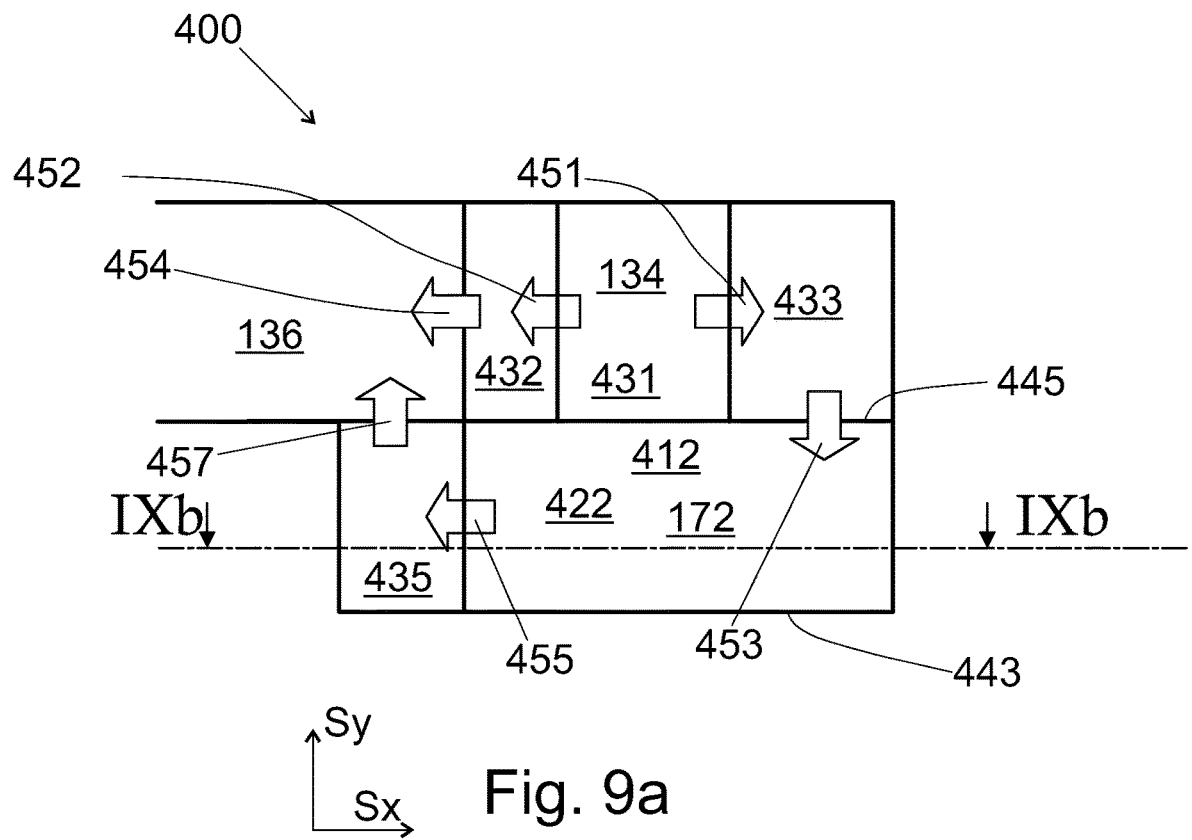
FIG. 9a shows a cross-sectional view of a loopseal heat exchanger.
Figure 9B:
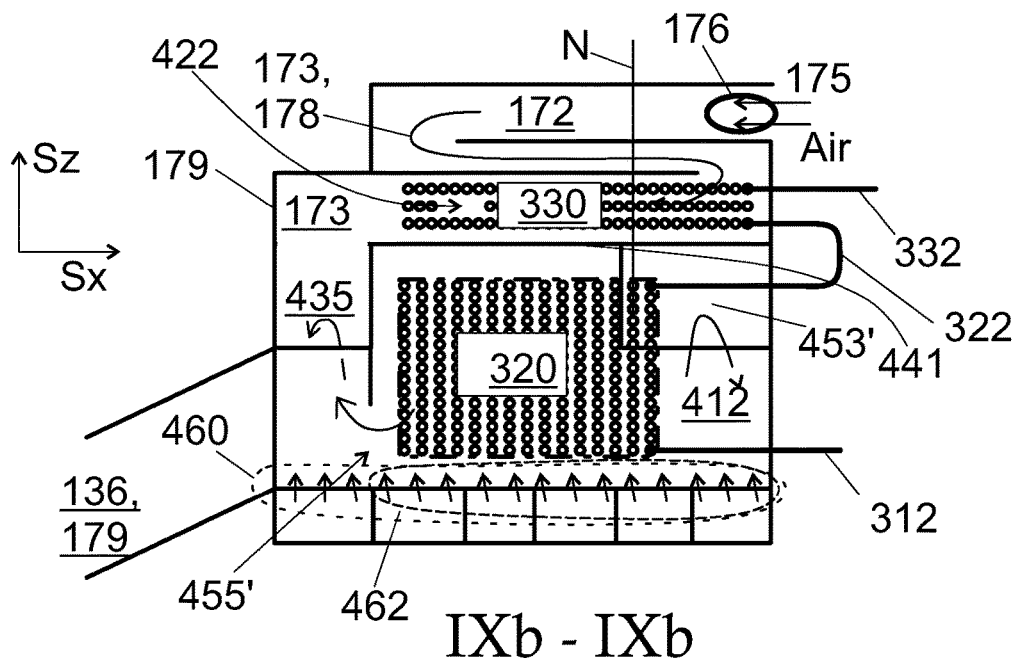
FIG. 9b shows a cross-sectional view IXb-IXb depicted in FIG. 9a of a loopseal heat exchanger.

Referring to FIGS. 9a and 9b, the third heat exchanger 330 may be arranged on top of the second heat exchanger 320. In such a case, the first wall 441 is substantially horizontal, as detailed in FIG. 9b. As discussed above, the second heat exchanger 320 is arranged on a first side of the first wall 441 and the third heat exchanger is arranged on a second, opposite, side of the first wall 441. Moreover, the first wall 441 limits the first chamber 412, in which the second heat exchanger 320 is arranged, and the first wall 441 limits the second chamber 422, in which the third heat exchanger 330 is arranged. Finally, the second 320 and third heat exchangers 330 are arranged such that a normal N of the first wall 441 runs through both the second 320 and third 330 heat exchangers. For technical effects, see above. The outlet header 320*b* of the second heat exchanger 320 may be connected to the inlet header of the third heat exchanger 330. Reference is made to FIG. 15. However, the steam chamber 335 may be vertical in such a case.

The second and third walls 443 and 445 are shown in FIG. 9*a*. As discussed above, the second heat exchanger 320 is arranged on a first side of the second wall 443 and the third heat exchanger 330 is arranged on the first side of the second wall 443. Moreover, the second wall 443 limits the first chamber 412, in which the second heat exchanger 320 is arranged, and the second wall 443 limits the second chamber 422, in which the third heat exchanger 330 is arranged. As discussed above, the second heat exchanger 320 is arranged on a first side of the third wall 445 and the third heat exchanger 330 is arranged on the first side of the third wall 445. Moreover, the third wall 445 limits the first chamber 412, in which the second heat exchanger 320 is arranged, and the third wall 445 limits the second chamber 422, in which the third heat exchanger 330 is arranged.

In the embodiment of FIGS. 9*a* and 9*b*, the second flue gas 173 can be used as fluidizing gas in the first furnace 162 e.g. by providing a flue gas passage on top of an outlet chamber 435. As readable from FIGS. 3 to 7, 9*a*, and 9*b*, the loopseal heat exchangers 400 of FIGS. 3 to 7 and FIGS. 9*a* and 9*b* may be similar with respect to the chambers through which the bed material is configured to flow, i.e. the chambers 431, 433, 412, 435, and 432. Thus, in the embodiment of FIGS. 9*a* and 9*b*, the second flue gas may flow through a flue gas passage provided in a roof of the outlet chamber 435, through the outlet chamber 435 to the return channel 136, and finally through the return channel 136 to the first furnace 162. Thus, the outlet chamber 435 forms a part of the channel 179 for conveying at least some of the second flue gas 173 to such a chamber of the fluidized bed boiler, wherein a fluidized bed is configured to form in use. For other parts of the channel 179, reference is made to FIG. 9*b*.

What has been said in connection with FIGS. 9*a* and 9*b* applies both to a loopseal heat exchanger 400 and a fluidized bed boiler 100.

Referring to FIGS. 10*a* to 10*f*, the third heat exchanger 330 may be arranged below the second heat exchanger 320. In such a case, the first wall 441 is substantially horizontal, as detailed in FIG. 10*b*. As discussed above, the second heat exchanger 320 is arranged on a first side of the first wall 441 and the third heat exchanger 330 is arranged on a second, opposite, side of the first wall 441. Moreover, the first wall 441 limits second chamber 422, in which the third heat exchanger 330 is arranged. Finally, the second 320 and third heat exchangers 330 are arranged such that a normal N of the first wall runs through both the second and third 330 heat exchangers. For technical effects, see above. The outlet header 320*b* of the second heat exchanger 320 may be connected to the inlet header of the third heat exchanger 330. Reference is made to FIG. 15. However, the steam chamber 335 may be vertical in such a case.

Figure 10A:
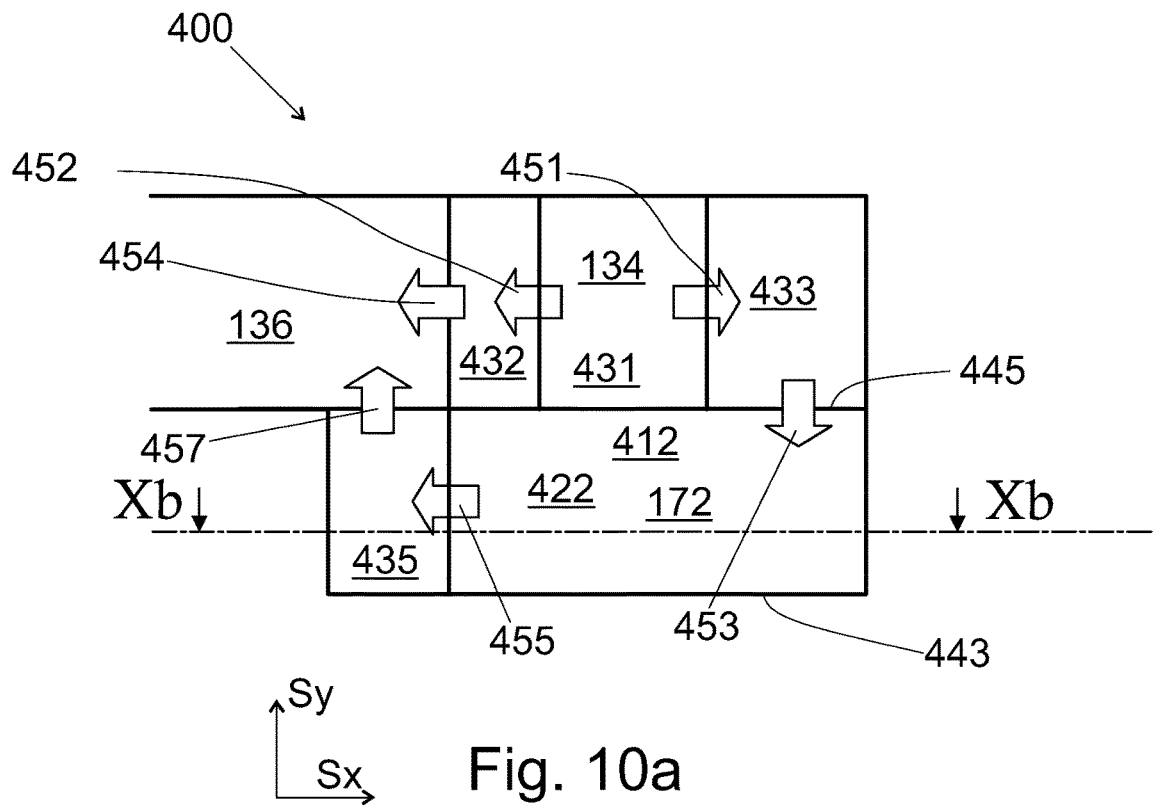
FIG. 10a shows a cross-sectional view of a loopseal heat exchanger.

The second and third walls 443 and 445 are shown in FIG. 10*a*. As discussed above, the second heat exchanger 320 is arranged on a first side of the second wall 443 and the third heat exchanger 330 is arranged on the first side of the second wall 443. Moreover, the second wall 443 limits the first chamber 412, in which the second heat exchanger 320 is arranged, and the second wall 443 limits the second chamber 422, in which the third heat exchanger 330 is arranged. As discussed above, the second heat exchanger 320 is arranged on a first side of the third wall 445 and the third heat exchanger 330 is arranged on the first side of the third wall 445. Moreover, the third wall 445 limits the first chamber 412, in which the second heat exchanger 320 is arranged, and the third wall 445 limits the second chamber 422, in which the third heat exchanger 330 is arranged.

Figure 10B:
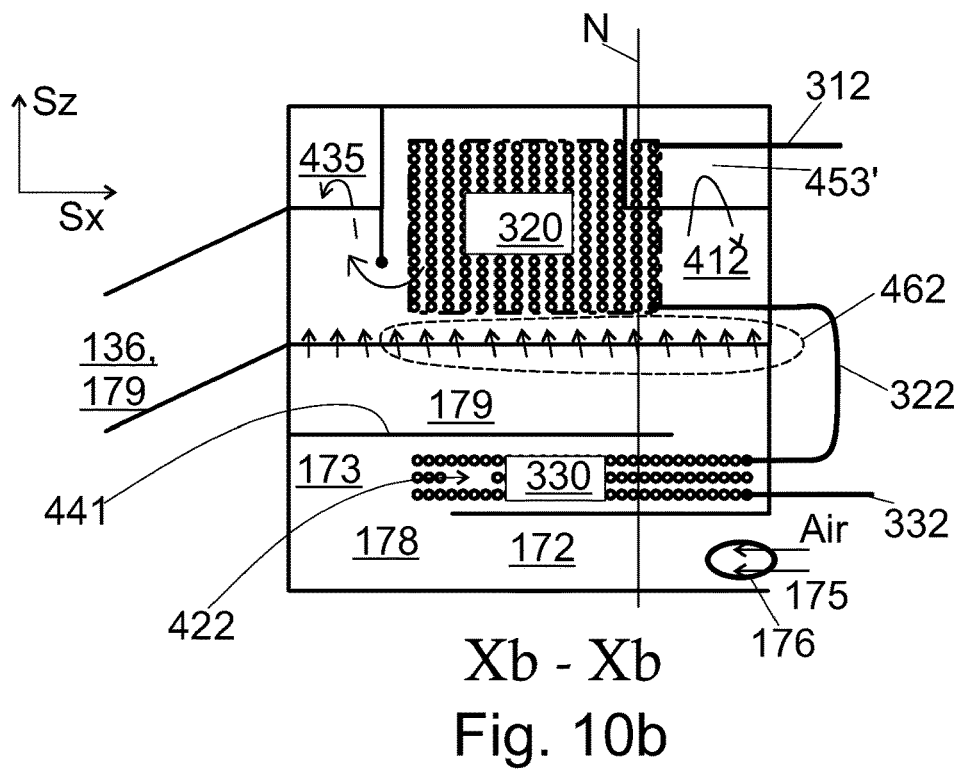
FIG. 10b shows a cross-sectional view Xb-Xb depicted in FIG. 10b of a loopseal heat exchanger.

In the embodiment of FIGS. 10*a* to 10*d*, the second flue gas 173 can be used as fluidizing gas in the first chamber 412. The principle is shown in FIG. 10*b*, wherein the second flue gas 173 flows through the heat exchanger pipes of the third heat exchanger 330 and therefrom, through the first nozzles 462, to the first chamber 412. In this embodiment, air ("Air" in FIG. 10*b*) is used both as oxidizing medium for the second fuel 175 (i.e. combustion air in the second furnace) and a fluidizing gas for the first chamber 412. Thus, in the second operating mode, i.e. during the second period (see FIG. 2*b*), the air could cool the heat exchange medium flowing through the third heat exchanger 330.

Figure 10C:
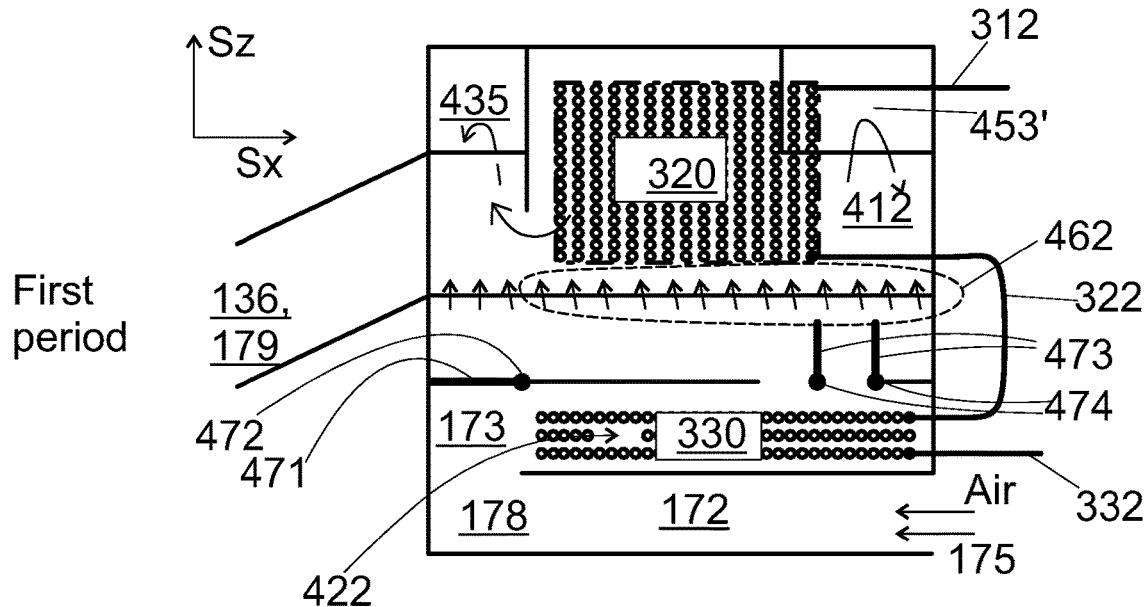
FIG. 10c shows a cross-sectional view of the loopseal heat exchanger of FIG. 10b, wherein some of the walls are formed of dampers, and the dampers are in a first position.
Figure 10D:
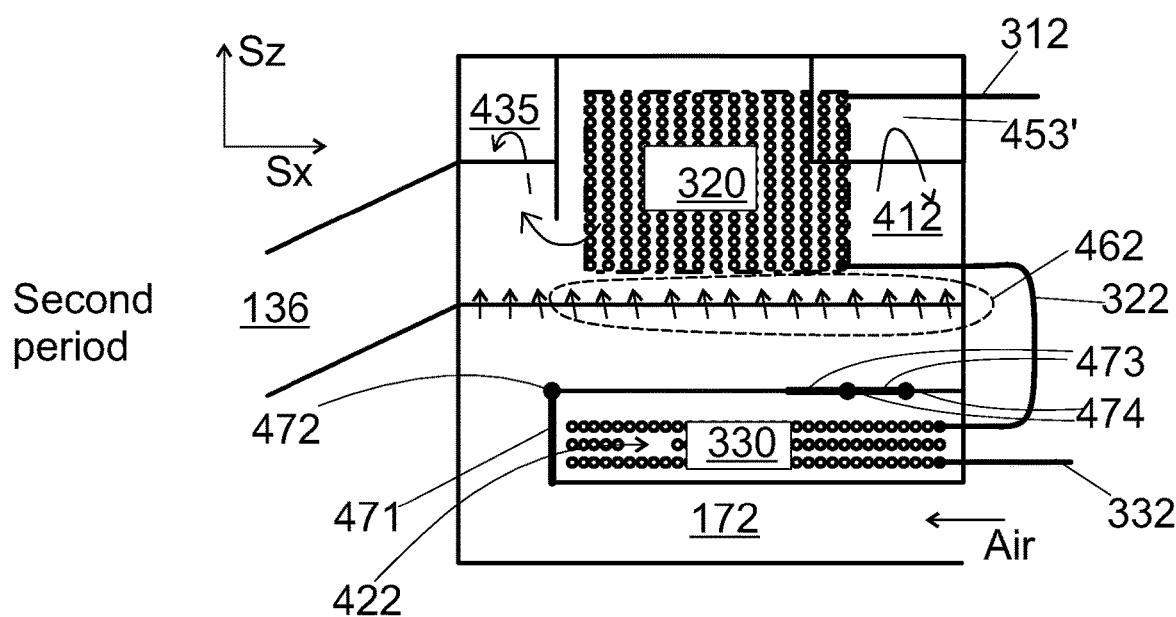
FIG. 10d shows a cross-sectional view of the loopseal heat exchanger of FIG. 10c, wherein the dampers are in a second position.

A solution to this problem has been shown in FIGS. 10*c* and 10*d*. The loopseal heat exchanger of FIGS. 10*c* and 10*d* comprises a first damper 471 and, optionally, a first pivot 472. The first damper 471 is pivotable about the first pivot 472. However, the damper 471 could be construed using two slidable dampers (one horizontal and one vertical corresponding to the positions of the first damper 471) without the need for a pivot. Referring to FIG. 10*c*, during the first period, the first damper 471 is arranged to such a position that it is configured to guide the second flue gas 173 to the third heat exchanger 330. Referring to FIG. 10*d*, during the second period, the first damper 471 is arranged to such a position that it is configured to guide fluidizing air or the second flue gas 173 as the case may be to bypass the third heat exchanger 330. In this embodiment, there is no need to burn even a small amount of the second fuel 175 during the second period. Thus, typically, in this embodiment, no second flue gas would be produced, and only the air would be guided by the first damper [A] to bypass the third heat exchanger 330 and [B] to the first nozzles 462.

In order to further secure that the air does not cool down the third heat exchanger 330 during the second period, the loopseal heat exchanger 400 may comprise a second damper 473 and, optionally, a second pivot 474, as shown in FIGS. 10*c* and 10*d*. FIGS. 10*c* and 10*d* show two second dampers 473 and a second pivot 474 for each second damper 473.

The second damper 473 is pivotable about the second pivot 474. As detailed above, Slidable dampers could be used instead or in addition. Referring to FIG. 10*c*, during the first period, the second damper 473 is arranged to such a position that the second damper 473 is configured to guide second flue gas 173 from the third heat exchanger 330 to the to the first nozzles 462. Referring to FIG. 10*d*, during the second period, the second damper 473 is arranged to such a position that it is configured to prevent the fluidizing air or the second flue gas 173 as the case may be from flowing to the third heat exchanger 330. In combination, the first and second dampers 471, 473 serve for the same purpose as the third damper 475 discussed in connection with FIG. 2*c*.

Therefore, an embodiment of a fluidized bed boiler 100 or a loopseal heat exchanger for a circulating fluidized bed boiler comprises a damper arrangement comprising at least one damper (471, 473, 475), wherein the damper arrangement is configured to enable circulation of second flue 173 gas from the second furnace 172 to the third heat exchanger 330 and prevent air circulation through the third heat exchanger 330.

The former applies at the first period (see FIGS. 2a, 2c, and 10c); and the latter applies at the second period (see FIGS. 2b, 2c, and 10d). Concerning the latter, the air therein may comprise second flue gas, provided that a minor amount of second flue is burned also during the second period.

It has further been found that in the first mode, i.e. at the first period, typically more combustion air is needed to burn the second fuel 175 than what is needed for fluidizing the bed material in the first chamber 412. It has been found that the excess heat can be recovered to the combustion air that is used for combustion in the second furnace 172.

Figure 10E:
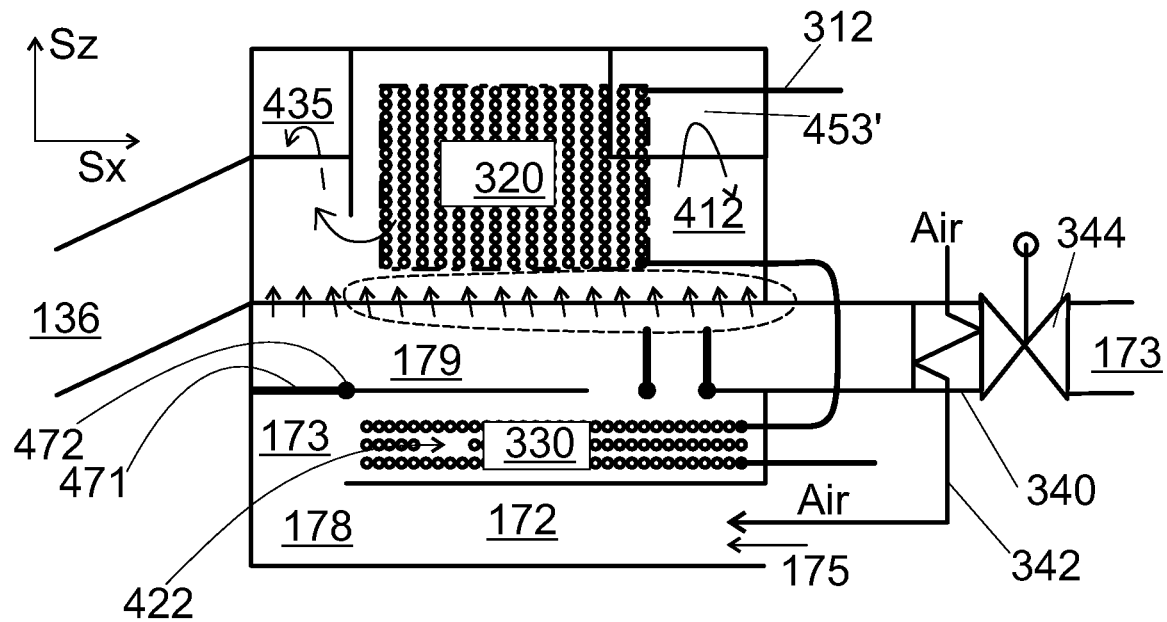
FIG. 10e shows recovering heat from excess second flue gas to heat fluidizing gas for a chamber having the second heat exchanger.

Referring to FIG. 10e, in embodiment, the loopseal heat exchanger 400 comprises a fourth heat exchanger 340. The fourth heat exchanger is configured to recover heat from the second flue gas 173 to air, in particular the combustion air use in the second furnace 172. The embodiment also comprises a fourth pipeline 342 configured to convey the heated air from the fourth heat exchanger 340 to the second furnace 172, to be used as an oxidizing medium therein. The embodiment also comprises a valve 344 configured to limit a flow of the second flue gas through the fourth heat exchanger 340. Thus, the valve 344 can be used to control how much second flue gas is used as the fluidizing gas in the loopseal heat exchanger 400. The second flue gas may be used to fluidize bed material also in another chamber (or other chamber) of the loopseal heat exchanger than the first chamber 412.

Figure 10F:
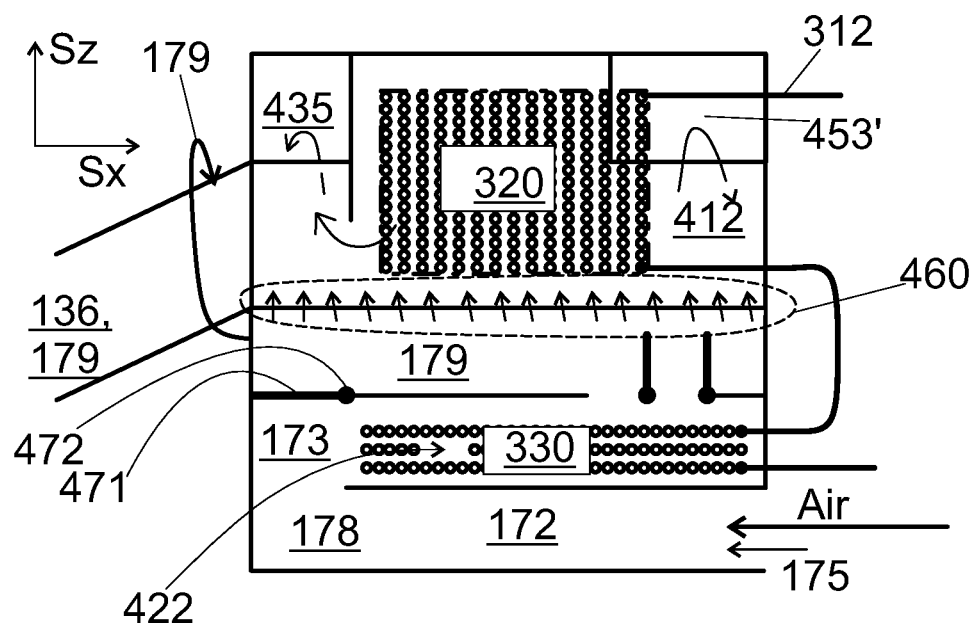
FIG. 10f shows using excess second flue gas as fluidizing gas in the first furnace.

To recover heat from the excess second flue gas 173, it is also possible to convey a part of the second flue gas 173 to the first furnace 162 and to use only a part of the second flue gas 173 as fluidizing medium in the loopseal heat exchanger 400. An example of such a solution is shown in FIG. 10f, wherein a portion of the second flue gas 173 is taken from a location upstream from the fluidizing nozzles 460 and conveyed through a part of the channel 179 to the return channel 136. Through the return channel 136 the second flue gas 173 flows to the first furnace 162 as detailed above in connection with e.g. FIG. 8a. A valve (not shown) may be applied to control the division of the second flue gas 173 to the part conveyed to the nozzles 460 and to the part conveyed to the first furnace 162. Even if not shown, the excess second flue gas 173 could be mixed with the combustion air of the first furnace 162 as detailed in FIG. 8b.

Heat of that part of the second flue gas 173 that is used for fluidizing the bed material in the second chamber 412, and therefore conveyed through the nozzles 460, can be recovered by using the gas as a part of the fluidizing gas in the first furnace 162 or in other ways detailed above. Reference is made to FIGS. 8a, 8b, 9a, and 9b. For example, an opening may be provided in an upper part of the outlet chamber 435 to allow for the used fluidizing gas to flow to the return channel 136, even another part of the second flue gas is used as depicted in FIG. 10e or 10f.

Even if not shown, the excess second flue gas 173, i.e. the part not conveyed through the nozzles 460, could be mixed with the first flue gas 163 downstream from a fluidized bed arranged in the first furnace 162, e.g. downstream from the cyclone 132 of a circulating fluidized bed boiler, as the case may be. In this case it would be beneficial to mix the flue gases 173, 163 upstream from the first heat exchanger 310. However, from the point of view of recovering energy, it is more beneficial to use the excess second flue gas or all the second flue gas as part of the fluidizing gas of the first furnace 162.

What has been said in connection with FIGS. 10a to 10f applies both to a loopseal heat exchanger 400 and a fluidized bed boiler 100.

Figure 12:
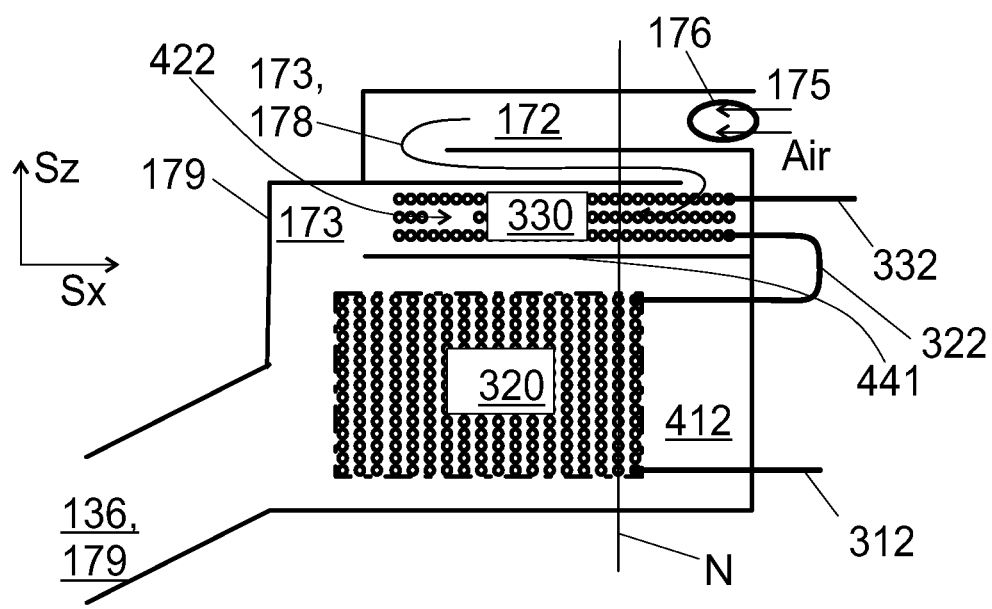
FIG. 12 shows a vertical cross-sectional view of a loopseal heat exchanger having fewer chambers than the loopseal heat exchanger of FIG. 9b.
Figure 13:
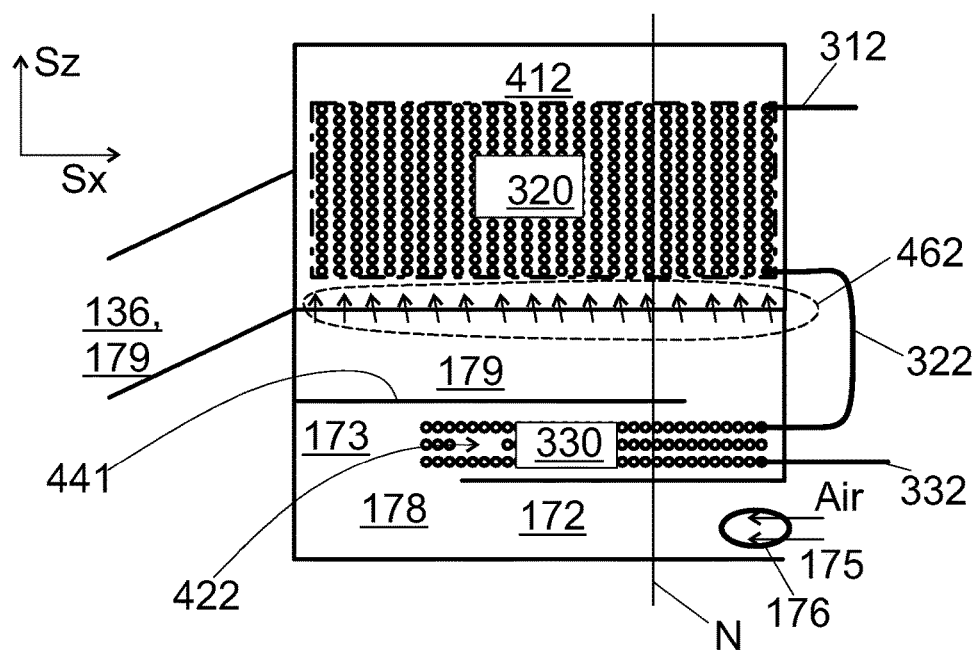
FIG. 13 shows a vertical cross-sectional view of a loopseal heat exchanger having fewer chambers than the loopseal heat exchanger of FIG. 10b.

While such chambers (431, 432, 433, 412, 435), through which bed material is configured to run, of the loopseal heat exchangers of FIGS. 3 to 10f have been arranged in the same manner relative to each other, the second furnace 172 and the third heat exchanger 330 can be provided also in simpler loopseal heat exchangers 400, as depicted in FIGS. 11 to 13.

In the loopseal heat exchangers of FIGS. 11 to 13, the bed material enters through the dipleg channel 134 to the entrance chamber 431, as in FIG. 3. However, from the entrance chamber 431, at least a part of the bed material enters directly the first chamber 412 as shown by the arrow 451. An aperture may be provided in a lower part of the entrance chamber 431 for this purpose. In the first chamber 412, the second heat exchanger 320 is provided. In the first chamber 412, the bed material flows upwards, and also in the negative Sx direction in FIG. 11. From the first chamber 412, the bed material exits to the return channel 136, as indicated by the arrow 457. An aperture may be provided in an upper part of the first chamber 412 for the purpose. The loopseal heat exchanger 400 of FIG. 11 comprises also a bypass chamber 432. At least some bed material may bypass the second heat exchanger 320 by flowing through the bypass chamber 432 as indicated by the arrows 452 and 454. What has been said about bed material circulation through the bypass chamber 432 in the embodiment of FIG. 3, applies also here.

The loopseal heat exchanger 400 of FIG. 11 comprises also the second chamber 422, in which the third heat exchanger 330 has been arranged, and the second furnace 172 provided with the burner 176. Even if not shown in FIG. 11, the second flue gas is configured to flow from the second furnace 172 to the second chamber 422, in which the third heat exchanger 330 has been provided. For reference, see FIG. 6, even if in FIG. 11, the second chamber 422 is arranged in the positive Sy direction from the second furnace 172.

The loopseal heat exchanger 400 of FIG. 11 comprises the a first wall 441. What has been said about the first wall 441 and the normal N thereof in connection with FIGS. 3 to 7 applies. The loopseal heat exchanger 400 of FIG. 11 comprises a second wall 443. What has been said about the second wall 443 in connection with FIGS. 3 to 7 applies. The loopseal heat exchanger 400 of FIG. 11 comprises a third wall 445. What has been said about the third wall 445 in connection with FIGS. 3 to 7 applies. An outlet header 320b of the second heat exchanger 320 may be connected to an inlet header 330a of the third heat exchanger 330 as depicted in FIG. 15.

Even if not shown, the loopseal heat exchanger 400 is provided with nozzles 460 for blowing fluidizing gas to the first chamber 412 (see nozzles 462 above) and with nozzles 460 for blowing fluidizing gas to the bypass chamber 432 (see nozzles 464 above) in order to fluidize the bed material therein.

In FIG. 11, the first chamber 412 and the second chamber 422 have been arranged side by side in the horizontal direction (Sx). However, they may be arranged such that the third heat exchanger 330 is arranged above the second heat exchanger, as depicted in FIG. 12. In the embodiment of FIG. 12, the second flue gas 173, downstream from the third heat exchanger 330, may be conveyed through the first chamber 412 to the return channel 136, to be used as fluidizing medium both in the first chamber 412 and in the first furnace 162. The loopseal heat exchanger 400 of FIG. 12 comprises a first wall 441. What has been said about the first wall 441 and the normal N thereof in connection with FIGS. 9a and 9b applies. Even if now shown, in FIG. 12, the loopseal heat exchanger 400 of FIG. 12 comprises the second and third walls 443, 445 for the same purpose as the walls 443 and 445 disclosed in connection with FIGS. 9a and 9b.

Moreover, the first chamber 412 and the second chamber 422 may be arranged such that the third heat exchanger 330 is arranged below the second heat exchanger 320, as depicted in FIG. 13. Therein, the second flue gas 173 cab be used for fluidizing the bed material in the first chamber 412. In case there is excess second flue gas available, a part of the flue gas need not be conveyed through the nozzles 460 (in particular 462). The excess second flue gas may be used in one of the ways discussed above in connection with FIGS. 10e and 10f. Cooling of the third heat exchanger 330 by the combustion air for the second fuel 175 can be prevented by the solution discussed above in connection with FIGS. 10c and 10d.

The loopseal heat exchanger 400 of FIG. 13 comprises a first wall 441. What has been said about the first wall 441 and the normal N thereof in connection with FIGS. 10a to 10f applies. Even if not shown in FIG. 13, the loopseal heat exchanger 400 of FIG. 13 comprises the second and third walls 443, 445 for the same purpose as the walls 443 and 445 disclosed in connection with FIGS. 10a to 10f.

The invention claimed is:

1. A method for heating a heat exchange medium in a fluidized bed boiler, the method comprising, at a first period of time, the steps of:
   burning first fuel in a first furnace of the fluidized bed boiler to produce first flue gas,
   recovering heat from the first flue gas to a heat exchange medium using a first heat exchanger,
   conveying the heat exchange medium from the first heat exchanger to a second heat exchanger, of which at least a part is arranged in contact with a fluidized bed of the fluidized bed boiler,
   burning second fuel in a second furnace of the fluidized bed boiler to produce second flue gas,
   conveying the heat exchange medium from the second heat exchanger to a third heat exchanger, and
   recovering heat from the second flue gas to the heat exchange medium using the third heat exchanger,
   wherein:
      the third heat exchanger is not in contact with a fluidized bed of the fluidized bed boiler, and
      the second flue gas comprises less alkali and halogen than the first flue gas and/or the second fuel comprises less alkali and halogen than the first fuel.

2. The method of claim 1, wherein the third heat exchanger is not in contact with the first flue gases.

3. The method of claim 1, further comprising, at a second period of time, the steps of:
   recovering heat from the fluidized bed of the fluidized bed boiler to the heat exchange medium using the second heat exchanger, and
   conveying the heat exchange medium from the second heat exchanger to the third heat exchanger, and
   either:
      [A] not burning the second fuel in the second furnace during the second period of time, or
      [B] burning less second fuel in the second furnace during the second period of time than during the first period of time.

4. The method of claim 3, further comprising, at the second period of time, conveying the heat exchange medium through the third heat exchanger.

5. The method of claim 3, wherein:
   during the second period of time, a load of the fluidized boiler is more than a load of the fluidized bed boiler during the first period of time;
for example,
   during the first period of time, a load of the fluidized boiler is less than a threshold and
   during the second period of time, a load of the fluidized boiler is at least equal to the threshold.

6. The method of claim 1, wherein at least one of
   the second fuel is liquid or gas, such as a gas comprising natural gas or a liquid comprising oil, or
   the first fuel comprises solid material, such as biomass and/or residue derived fuel.

7. The method of claim 1, further comprising the step of circulating bed material from the first furnace to a cyclone, from the cyclone to a loopseal, and from the loopseal to the first furnace, wherein the second heat exchanger is arranged in the loopseal of the of the fluidized bed boiler.

8. The method of claim 7, wherein:
   a first side of a wall of a loopseal heat exchanger limits a first chamber,
   the first side or an opposite second side of the wall of the loopseal heat exchanger limits a second chamber,
   the second heat exchanger is arranged in the first chamber or in a wall limiting the first chamber, and
   the third heat exchanger is arranged in the second chamber or in a wall limiting the second chamber.

9. The method of claim 1, further comprising fluidizing a fluidized bed within the fluidized bed boiler using fluidizing gas that comprises at least some of the second flue gas.

10. A fluidized bed boiler, comprising:
   a first furnace for burning first fuel comprising solid material to produce first flue gas,
   a first heat exchanger for recovering heat from the first flue gas to a heat exchange medium,
   a second heat exchanger arranged in such a location of the fluidized bed boiler that in use, a fluidized bed comprising bed material is configured to contact the second heat exchanger,
   a first pipeline for conveying the heat exchange medium from the first heat exchanger to the second heat exchanger,
   a second furnace for burning second fuel to produce second flue gas,
   a burner arranged in the second furnace, and
   a third heat exchanger for recovering heat from the second flue gas to the heat exchange medium received from the second heat exchanger,
   wherein:
      the third heat exchanger is configured not to be in contact with a fluidized bed of the fluidized bed boiler, and
      the burner is configured to burn second fuel, which is liquid or gas, and the second flue gas comprises less alkali and halogen than the first flue gas and/or the second fuel comprises less alkali and halogen than the first fuel.

11. The fluidized bed boiler of claim 10, further comprising:
a cyclone, and
a loopseal,
wherein bed material is configured to circulate from the first furnace through the cyclone to the loopseal and from the loopseal to the first furnace.

12. The fluidized bed boiler of claim 11, wherein:
the fluidized bed boiler comprises a loopseal heat exchanger arranged in the loopseal,
the loopseal heat exchanger comprises a first chamber and a second chamber,
the second heat exchanger is arranged in the first chamber or in a wall that limits the first chamber,
the third heat exchanger is arranged in the second chamber or in a wall that limits the second chamber,
a first side of a wall limits the first chamber, and
the first side of the wall or an opposite second side of the wall limits the second chamber.

13. The fluidized bed boiler of claim 10, further comprising a channel for conveying at least some of the second flue gas to such a part of the fluidized bed boiler, wherein a fluidized bed is configured to form in use.

14. A power plant, comprising:
the fluidized bed boiler of claim 10,
a steam turbine,
a pipeline configured to convey heat exchange medium from the third heat exchanger to the steam turbine, and
an electricity generator arranged in a mechanical connection with the steam turbine.

* * * * *